US011769101B2

(12) United States Patent
Lala

(10) Patent No.: US 11,769,101 B2
(45) Date of Patent: Sep. 26, 2023

(54) METHOD AND SYSTEM FOR VISUALIZING PERFORMANCE INDICATORS OF ONBOARD SERVICES PROVIDED DURING SIMILAR TRIPS

(71) Applicant: VIASAT, INC., Carlsbad, CA (US)

(72) Inventor: Sanjay V. Lala, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/014,076

(22) PCT Filed: Nov. 24, 2020

(86) PCT No.: PCT/US2020/062115
§ 371 (c)(1),
(2) Date: Dec. 30, 2022

(87) PCT Pub. No.: WO2022/010524
PCT Pub. Date: Jan. 13, 2022

(65) Prior Publication Data
US 2023/0230012 A1 Jul. 20, 2023

Related U.S. Application Data

(60) Provisional application No. 63/049,788, filed on Jul. 9, 2020.

(51) Int. Cl.
G06Q 50/30 (2012.01)
G06Q 10/0639 (2023.01)
(Continued)

(52) U.S. Cl.
CPC ....... *G06Q 10/06393* (2013.01); *G06Q 50/30* (2013.01); *G07C 5/008* (2013.01); *G07C 5/0841* (2013.01)

(58) Field of Classification Search
CPC .. G06Q 10/06393; G06Q 50/30; G07C 5/008; G07C 5/0841
See application file for complete search history.

(56) References Cited

U.S. PATENT DOCUMENTS

2020/0005639 A1* 1/2020 Walsh ...................... G08G 1/13

OTHER PUBLICATIONS

International Searching Authority, Search Report, in Application No. PCT/US2020/062115, dated Mar. 26, 2021, 11 pages.
(Continued)

*Primary Examiner* — Ankur Jain
(74) *Attorney, Agent, or Firm* — HOLZER PATEL DRENNAN

(57) ABSTRACT

In some embodiments, a method comprises: identifying past trips, each of the past trips having a past trip characteristic similar to a particular trip characteristic of a particular trip; obtaining a vehicle identifier used during each of the past trips; obtaining status of one or more onboard services provided during each of the past trips; generating interface data representing: a past trip header, the past trip characteristic for each of the past trips, the vehicle identifier used during each of the past trips, an icon for each of the past trips having a feature indicating the status of one or more onboard services provided during the past trip, and an additional icon indicating status of onboard services provided during the particular trip; transmitting the interface data to cause a display device to generate/display a viewer.

21 Claims, 10 Drawing Sheets

(51) Int. Cl.
*G07C 5/00* (2006.01)
*G07C 5/08* (2006.01)

(56) References Cited

OTHER PUBLICATIONS

International Searching Authority, Corrected Search Report, in Application No. PCT/US2020/062115, dated Mar. 31, 2021, 4 pages.
International Preliminary Examining Authority, International Preliminary Report on Patentability, in Application No. PCT/US2020/062115, dated May 18, 2022, 6 pages.
Amendments under Article 34, in Application No. PCT/US2020/062115, dated Nov. 24, 2020, 123 pages.

* cited by examiner

Previous Flights

| DEPARTURE | TAIL ID | IFC AVAILABILITY |
|---|---|---|
| 18/03/20 - 09:05 | V943AV | ⊘ 99% |
| 18/03/20 - 19:05 | V943AV | ◐ 95% |
| 19/03/20 - 09:05 | V943AV | ⊘ 100% |
| 19/03/20 - 18:00 | V943AV | ⊘ 100% |
| 21/03/20 - 07:05 | V943AV | ◐ 95% |
| 22/03/20 - 14:00 | V943AV | ⊗ 87% |
| 22/03/20 - 09:05 | V943AV | ⊗ 78% |
| 24/03/20 - 10:15 | V943AV | ⊗ 82% |
| 24/03/20 - 09:05 | V943AV | ⊗ 69% |
| 18/03/20 - 09:05 | V943AV | ⊘ 100% |

*FIG. 4B*

VEHICLE DATA

500

*555 Selecting a vehicle identifier of a past trip causes generating and displaying a past-vehicle-viewer 500 depicting information about a past vehicle used during the past trip*

| | 30 Day Summary | | |
|---|---|---|---|
| XXXX Tail ID  504 | X  506 Cases Opened | _  508 Equipment Swaps | X  510 Passenger Contacts |

See More aircraft details  512

Line Replaceable Units:

| ID # | Status | | Hardware | Software |
|---|---|---|---|---|
| | Status | Last Status | Part# Revision | Revision |
| XXXX | ⊙ | 20Mar2018 08:59 AED | XXXX XXXX | XXXX |
| XXXX | ⊙ | 20Mar2018 08:59 AED | XXXX XXXX | XXXX |
| XXXX | ⊙ | 20Mar2018 08:59 AED | XXXX XXXX | XXXX |
| XXXX | ⊙ | 20Mar2018 08:59 AED | XXXX XXXX | XXXX |
| XXXX | ⊙ | 20Mar2018 08:59 AED | XXXX XXXX | XXXX |
| XXXX | ⊙ | 20Mar2018 08:59 AED | XXXX XXXX | XXXX |
| XXXX | ⊙ | 20Mar2018 08:59 AED | XXXX XXXX | XXXX |
| XXXX | ⊙ | 20Mar2018 08:59 AED | XXXX XXXX | XXXX |
| XXXX | ⊙ | 20Mar2018 08:59 AED | XXXX XXXX | XXXX |

① ⚠Impaired ⊙Normal ☐Unknown

522

| Case | | | Progress | | |
|---|---|---|---|---|---|
| Type | Category | Subject | Priority | Status | Created |
| XXXX | XXXX | XXXX | XXXX | Waiting on Custom | 18Mar2018 |
| XXXX | XXXX | XXXX | XXXX | Resolved/Recov | 18Mar2018 |

Previous | Next

▼ Previous Flights

| DEPARTURE | TAIL ID | IFC AVAILABILITY |
|---|---|---|
| 01/04/2019 - 01:00 | V943AV | ⊙ 87% |
| 02/04/2019 - 02:00 | V983AV | ⊙ 98% |
| ... | | |

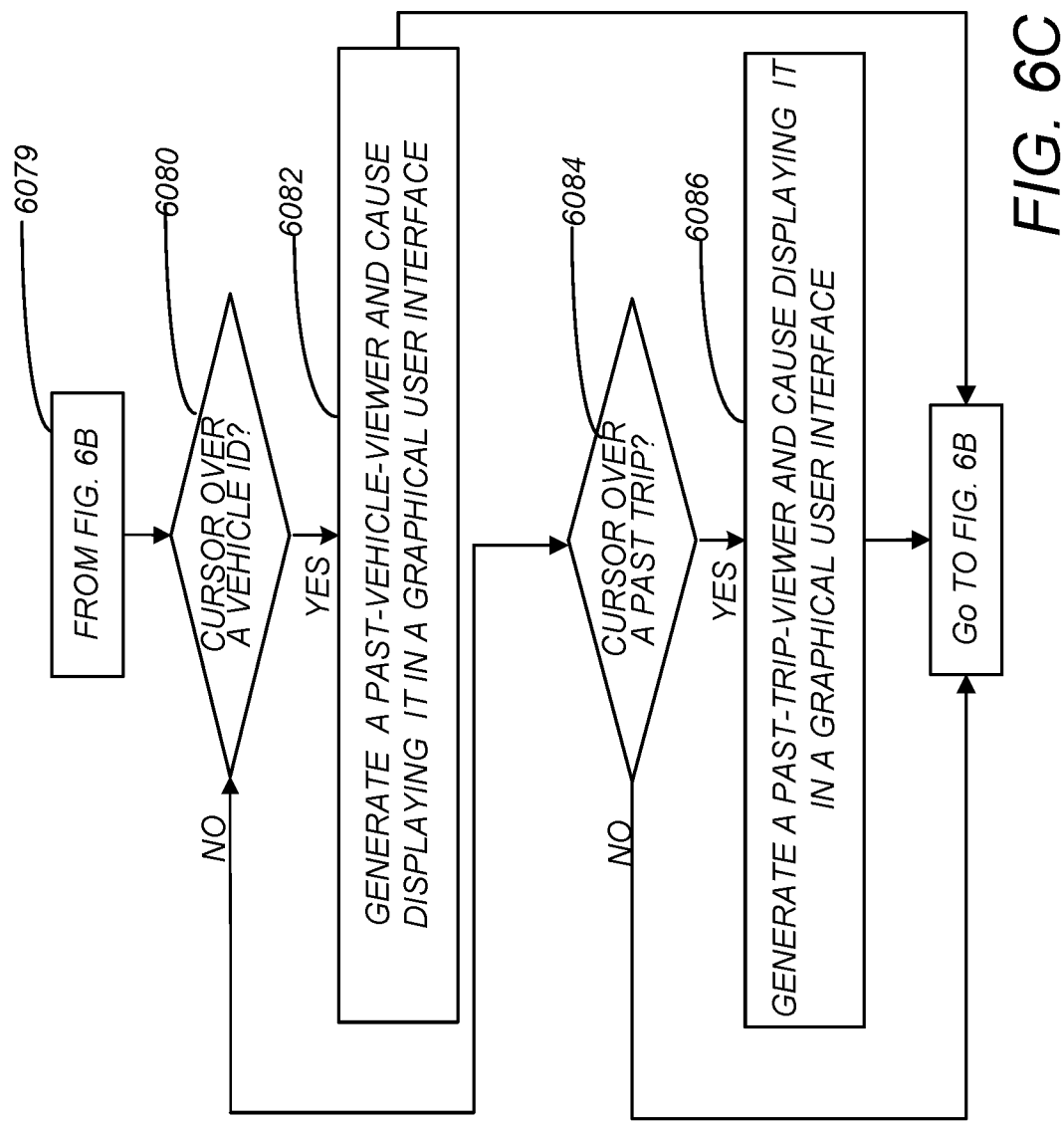

METHOD AND SYSTEM FOR VISUALIZING PERFORMANCE INDICATORS OF ONBOARD SERVICES PROVIDED DURING SIMILAR TRIPS

BENEFIT CLAIM; CROSS REFERENCE TO A RELATED APPLICATION

This application claims the benefit under 35 U.S.C. § 119 of provisional application 63/049,788, filed Jul. 9, 2020, the entire contents of which are hereby incorporated by reference for all purposes as if fully set forth herein.

BACKGROUND

The present disclosure generally relates to mobile communications systems, and more specifically to monitoring communications systems that provide onboard services on vessels such as aircrafts, trains, boats, cruisers, busses, and the like. The onboard services may include various communications and entertainment services such as access to the Internet and computer-based entertainment.

Quality of onboard services provided on vessels is often measured in terms of bandwidth, availability, reliability, usability, and speed. As the quality of the services provided on the vessels increases, so does the satisfaction and enjoyment of the passengers and crew. However, providing the high-quality onboard services often requires that the services are continuously monitored, and the problems with the services are solved as quickly as possible. US Published Patent Application No. 2020/0005639 to Walsh (claiming priority to Jun. 27, 2019) discloses an approach for generating a vehicle data interface that depicts performance data associated with a communications service provided on a vehicle during one or more previous trips of the same vehicle.

To effectively monitor the onboard services, status and metrics data specific to the services are collected and compared to determine which vessels or trips experience problems in providing the onboard services. Therefore, there is a need for improved methods for monitoring the performance of onboard services provided on the vessels during the trips.

SUMMARY

In some embodiments, a method for visualizing performance indicators of onboard services provided during past trips that are similar to a particular trip is presented. The past trips and the particular trip may be, for example, flights carried by commercial or military aircrafts. A particular trip may be an ongoing trip, while a past trip may be a trip that has been already completed and that is in some way similar to the ongoing particular trip. Two trips may be similar when they both have the same departure time, or the same arrival time, etc. Detail definitions of the similar trips are provided later.

The approach may also include generating a past-trips-viewer that comprises performance indicators of onboard services provided on past trips that are similar to a particular trip. Performance indicators for a trip may capture numerical values that represent measures of the quality of the corresponding onboard services provided during the trip. The performance indicators that are particularly important may be referred to as key performance indicators. The performance indicators may be represented in the viewer using icons that graphically and/or textually represent the status of the onboard services provided during the past trips.

Providing the past-trip-viewer provides many benefits. For example, a control center operator may compare the status of onboard services provided during a past trip with the status of onboard services provided during a particular trip to determine whether the quality of the onboard services provided during the trips has been diminishing and if it has, to determine a source of, or a reason, for the diminishing quality. The comparison may allow the operator to, for example, quickly assess whether the onboard service issues are related to the particular trip, the past trips, network-related problems occurring during the trips, vessels on which the services are provided, or the varying demands for the onboard services provided during the trips.

Similarity between a past trip and a particular ongoing trip may be determined using a variety of approaches. For example, the similarity may be determined by comparing a characteristic of a past trip with a characteristic of a particular trip to determine whether the corresponding characteristics are similar. Examples of characteristics may include a trip origin, a trip destination, a trip departure time, a trip arrival time, a trip identifier, a vessel identifier of the vessel used during the trip, and the like. An origin of a trip may correspond to an airport at which the trip was originated, while a destination of a trip may correspond to an airport at which the trip ended. A characteristic of a past trip is similar to a characteristic of a particular trip when, for example, both trips originated at the same location, or when both trips ended at the same destination. Different ways of determining the similarity between trips are described in FIG. 6A.

Once one or more past trips that are similar to a particular trip are identified, trip identifiers for the one or more past trips are obtained. Furthermore, for each past trip, of the past trips that are similar to the particular trip, status of onboard services provided during the past trip is obtained. Examples of onboard services may include inflight communications (IFC), default communications sessions, paid sessions, messaging sessions, free sessions, Wi-Fi sessions, TV sessions, data usage, and the like. The status of onboard services that were provided during a trip may correspond to a performance indicator of corresponding onboard services provided during an entire duration of the trip. The status may be represented as a numerical value. In some embodiments, the status is represented as a percentage of time selected from the range [0%, 100%], where 0% indicates no services, while 100% indicates an excellent quality of the services.

The information obtained for the past trips may be used to generate a first graphical interface data. The first graphical interface data may include a past trip characteristic for each of the past trips, a vehicle identifier for each of the past trips of a vehicle used during the past trip, and icons for the past trips. An icon for a past trip may have one or more features indicating the status of the onboard services provided during the past trip. Furthermore, the first graphical interface data may include a past trip header comprising labels for the past trip characteristic, the vehicle identifier, and the onboard services.

The first graphical interface may also include an additional icon to indicate, for the particular trip, the status of the onboard services provided during the particular trip. The additional icon may be displayed in a particular-trip-viewer generated for the particular trip.

Features of an icon and/or features of an additional icon may vary from one embodiment to another. For example, some features may include a color object and/or an alphanumeric string representing the status. The color object may be a color circle in which the color is used to graphically indicate whether the status of the onboard services provided during the trip was excellent, good, fair, or poor. The alphanumeric string may numerically indicate a percentage value representing a percentage of time during which the onboard services were provided during the trip.

In some embodiments, the first graphical interface data is transmitted to a display device to cause the display device to generate and display a past-trips-viewer. The past-trips-viewer comprises the past trip header, and the past trip characteristic, the vehicle identifier, and the icon for each of the one or more past trips arranged in rows under the past trip header.

In some embodiments, transmitting the first graphical interface data to the display device also causes the display device to generate and display the particular-trip-viewer that comprises the additional icon for the particular trip. The additional icon displayed in the particular-trip-viewer may be used to indicate the status of onboard services provided during the particular trip.

Both the past-trips-viewer and the particular-trip-viewer may be used to help in visualizing the quality of onboard services provided during the past trips and the quality of onboard services provided during the particular trip. Since the visual comparison of the icons indicating the status of the onboard services provided during the past trips and the particular trip can be easy and straightforward, it can allow a user to easily determine whether, for example, the quality of the onboard services has been diminishing over time, and if so on which trips.

In some embodiments, each past trip displayed in a past-trips-viewer is selectable and the selection causes generating a request for displaying a past-trip-viewer for that past trip. For example, in response to determining that a pointing device is hovering over a departure information displayed for a past trip in the past-trips-viewer, information about the past trip may be obtained and used to generate second graphical interface data representing the information about the past trip. The second graphical interface data may be transmitted to a display device to cause the display device to generate a past-trip-viewer for the past trip.

In some embodiments, each vehicle identifier displayed in a past-trips-viewer is selectable and the selection causes generating a request for displaying a past-vehicle-viewer for a vehicle used during that past trip. For example, in response to determining that a pointing device is hovering over a vehicle identifier of a vehicle used during a past trip and displayed in the past-trips-viewer, information about the vehicle having the vehicle identifier is obtained and used to generate third graphical interface data representing the information about that vehicle. The third graphical interface data may be transmitted to a display device to cause the display device to generate a past-vehicle-viewer to depict the information about the vehicle.

In some embodiments, an apparatus for generating a past-trips-viewer comprising performance indicators of onboard services provided during past trips that are similar to a particular trip is presented. The apparatus comprises a processor, memory in electronic communications with the processor, and instructions stored in the memory and executable by the processor to cause the processor to perform the steps of the method described herein.

In some embodiments, one or more non-transitory computer-readable storage media storing one or more instructions for generating a past-trips-viewer comprising performance indicators of onboard services provided on past trips that are similar to a particular trip is presented. The instructions of the storage media may be stored in the memory and when executed by one or more processors, may cause the processors to perform the steps of the method described herein.

BRIEF DESCRIPTION OF THE DRAWINGS

A further understanding of the nature and benefits of the present approaches may be realized in reference to the following drawings. In the appended drawings, similar components or features may have the same reference label. Further, various components of the same type may be distinguished by following the reference label by a second label that distinguishes among the similar components.

In the drawings:

FIG. 4B is an example of a graphical user interface for generating and displaying a past-trips-viewer for past trips that are similar to a particular trip.

FIG. 5A is an example of a graphical interface for depicting a past-vehicle-viewer showing information about a particular vehicle and generated when a pointing device is hovering over a past vehicle identifier shown in a past-trips-viewer in accordance with one or more embodiments.

FIG. 6C is an example process for generating a graphical user interface showing a past-trip-viewer when a pointing device is hovering over a past trip in a past-trips-viewer and generating a graphical user interface showing a past-vehicle-viewer when a pointing device is hovering over a past vehicle identifier in the past-trips-viewer.

DETAILED DESCRIPTION

Figure 1:
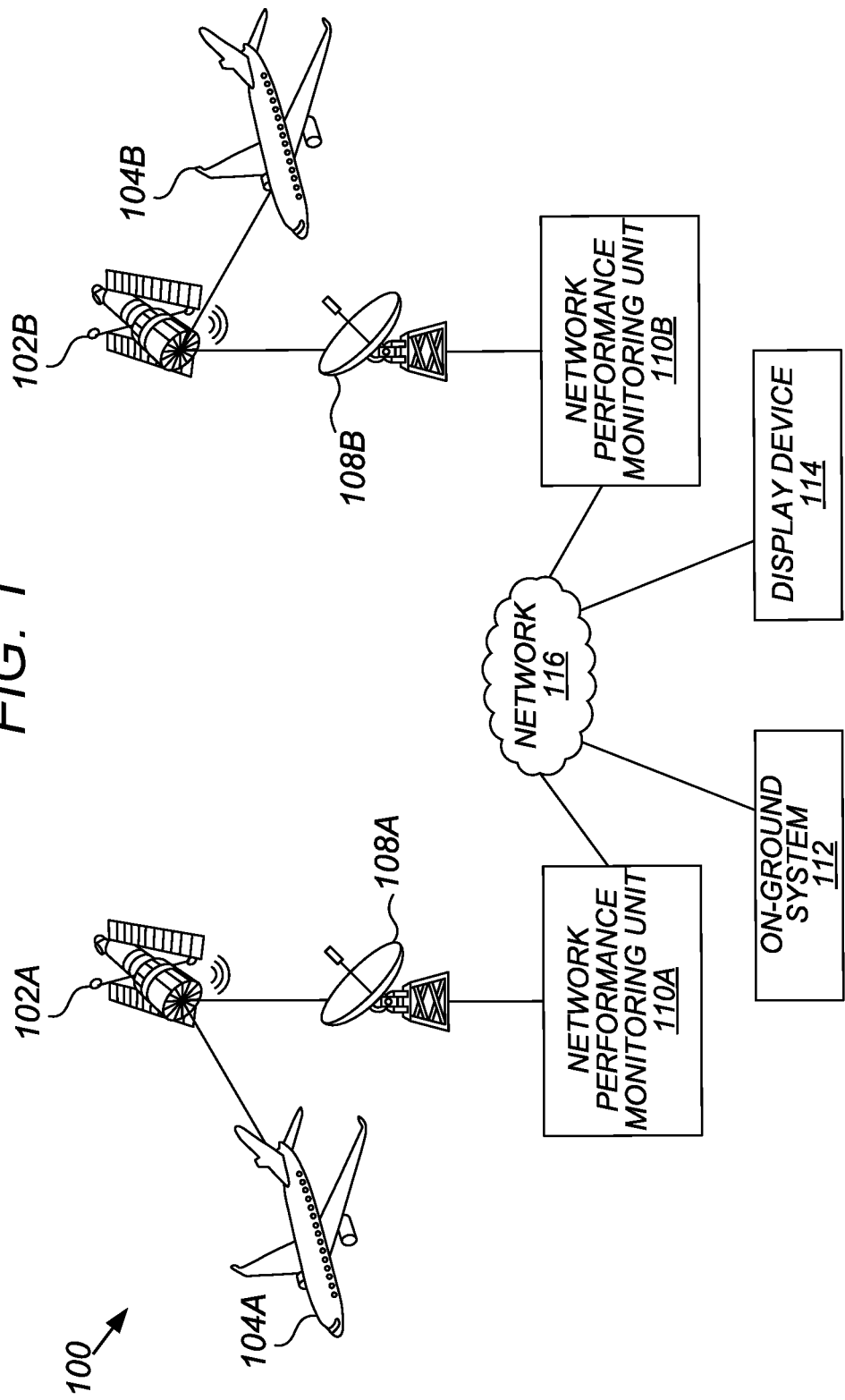
FIG. 1 is an example of a block diagram of a network communications system in accordance with one or more embodiments.

In the following description, for the purposes of explanation, numerous specific details are set forth in order to provide a thorough understanding of the methods described herein. It will be apparent, however, that the present approaches may be practiced without these specific details. In some instances, well-known structures and devices are shown in a block diagram form to avoid unnecessarily obscuring the present approaches.

Example Communications System for Generating a Past-Trips-Viewer with Similar Past Flights Vessels, such as aircrafts and boats, may be equipped with onboard systems configured to provide communications services during the trips. A user experience related to consumption of the onboard communications services provided during a trip may be impacted by the performance of the communications servers and communications connections established between the vessel, satellites and on-ground systems. The term "trip," as used herein, may refer to a travel segment and/or a time period of the travel segment, and may include a flight, voyage, cruise, or excursion carried on by the vessel.

In some implementations, embodiments of the present disclosure provide for generating first graphical interface data comprising status information of onboard services provided during past trips that are similar to a particular trip. The first graphical interface data may also comprise status information of onboard services provided during the particular trip.

The first graphical interface data may be used to generate a past-trips-viewer indicating status of onboard services provided during the past trips that are similar to a particular trip. The first graphical interface data may be also used to generate a particular-trip-viewer indicating status of onboard services provided during the particular trip. The status, depicted in the particular-trip-viewer, of onboard services provided during the particular trip may be compared with the status (depicted in the past-trips-viewer) of the same onboard services provided during the past trips to determine whether the quality of the onboard services provided during the trips has been diminishing, and if so, what might have caused the diminished quality.

The terms "graphical interface data" and "interface data," as used herein, may refer to any data in a computer system that is related to the representation of one or more graphical user interfaces or portions thereof. Graphical interface data may represent, for example, various graphical icons and/or other visual identifiers or features. Furthermore, the graphical interface data may include data or code providing instructions for generating or displaying/presenting various graphical icons and other visual identifiers and features on a display device.

Graphical interface data may also refer to any type of user interface pages or portions of pages having any type of content. Graphical interface data may refer, for example, to a page of a website, a page of a network-enabled application, or the like, or to any type of code used by a user interface to generate webpages, content pages, or interfaces. Graphical interface data may comprise code conforming to any suitable or desirable language, such as hypertext markup language (HTML) code, Java or JavaScript code, Android code, iOS code, other embedded device operating system code, or the like.

Status information of onboard services provided during a trip may correspond to a performance indicator(s) of the onboard service(s) provided during a trip and may be represented in a graphical interface using icons or other visual objects.

User input, such as a click, tap, hover, or the like, associated with an icon or other representations of vessels, trips, and the like, may trigger, or result in, the generation, provision, and/or presentation of graphical interface data related to a communications service provided on the vessel and/or associated hardware devices with respect to trips carried on by the vessel.

An icon may have one or more features, including, for example, visual features. Certain visual features of an icon may indicate a status level of hardware device(s) and/or communications services provided on the vessel. Therefore, a user may be prompted to provide user input associated with a vehicle icon or may otherwise be notified of communications services status. By allowing for user input and interaction associated with the icons displayed in a graphical interface, a user may be able to access, for example, the vehicle data and/or trip data for vehicles through the interaction or engagement with the icons represented in the interface.

Vehicle data associated with a communications service provided on a vessel may include any type of communications-service-related information associated with the vessel. For example, vehicle data may indicate the service cases opened for the vessel within a time period. Vehicle data may further provide information about communications-service hardware replacement or maintenance. Such information may provide insight as to whether the equipment replacement might have contributed to the communications service performance on the vessel.

Trip data associated with a communications service provided during a trip may include any type of communication-service-related information associated with the trip. For example, trip data may indicate the passenger experience reporting events captured during the trip or the passenger experience reporting availability of the onboard services provided during the trip.

Status of a service type of the onboard services provided on a vessel may be represented in a variety of ways. For example, the status may be represented by a single value (e.g., a number) and/or by a set of metrics values (e.g., a set of numbers). A single status value for a service type may be computed by aggregating different metrics data values determined for the service type provided during, for example, a plurality of trips conducted by the vessel within a time period. For example, the status information of the network connectivity provided by a vessel may be a single value that represents an aggregation of the measures of the connection between the vessel and the network during all trips conducted by the vessel within a time period. According to another example, the status of the network connectivity provided by a vessel may be represented by a set of metrics values where each value is computed by aggregating the measures of the connections provided during a particular trip, or a plurality of trips, conducted by the vessel within a time period.

Counts and types of service types of onboard services provided to passengers during trips may vary from one embodiment to another. Examples of communications service types may include network connectivity to the Internet and/or other networks. Examples of inflight entertainment service types may include streaming TV service, an inflight entertainment services providing access to content stored onboard such as movies, shows and the like. The availability and utilization of the onboard services may be collected by computer servers installed, for example, in the vessels. The servers installed in the vessels may be referred to as onboard servers. The onboard servers may transmit the collected metrics data to one or more on-ground systems, which in turn, may process and aggregate the data, and display the aggregated data on display devices in the form of, for example, past-trips-viewers, particular-trip-viewers, trip-data viewers, and vehicle-data-viewers.

Communications Systems

In some implementations, the present disclosure provides a method for visualizing performance indicators of onboard services provided during similar trips. The method may be implemented as part of a communications system described herein. The performance indicators of the onboard services may be visualized using a graphical interface configured to generate and display, for example, a past-trips-viewer depicting status information of communications services provided during one or more past trips that are similar to a particular ongoing trip. The past trips are the trips that have a characteristic that is similar to a characteristic of the particular ongoing trip. For example, if a particular ongoing trip is a trip between Los Angeles, Calif., and Mesa, Ark., is carried out by a vessel having a tail identifier of V943AV, and started at 7 AM PST on Tuesday, then examples of similar past trips may include the trips that departed from Los Angeles to Mesa at 7 AM on any day, or the trips that departed from Los Angeles to Mesa on Tuesday at any time, or the trips that departed from Los Angeles on any Tuesday and 7 AM PST, or the like. Examples of specific definitions of the similar trips are provided in FIG. 6A.

FIG. 1 is an example of a block diagram of a network communications system 100 in accordance with one or more embodiments. In some embodiments, communications system 100 comprises one or more communications satellites 102A-102B, one or more vessels 104A-104B, one or more network gateways 108A-108B, one or more network performance monitoring units 110A-110B, one or more on-ground systems 112, one or more display devices 114, and one or more data communications network 116. Other embodiments may include fewer or more components.

In some embodiments, communications system 100 supports two-way communications between vessels 104A-104B, gateways 108A-108B, network performance units 110A-110B, network 116, on-ground systems 112, and potentially other components (not shown) of system 100 via an air-to-ground connectivity, or otherwise.

Display devices 114 may be configured to display, for example, contents of past-trips-viewers, particular-trip-viewers, vehicle-data-viewers, trip-data-viewers, and the like. For example, display device 114 may be configured to generate a graphical user interface for presenting a past-trips-viewer visualizing performance indicators of onboard services provided during past trips that are similar to a particular trip.

Satellites 102A-102B may be configured to provide network communications connectivity to communications systems implemented in vessels 104A-104B, including target devices implemented and/or present in vessels 104A-104B. The target devices may be mobile devices that are operated by the crew and passengers of vessels 104A-104B, and may include smartphones, tablets, iPods, laptops, PDAs, and the like. Satellites 102A-102B may, for example, facilitate network communications to and from the target devices to provide Internet access, TV shows, movies, data news feeds, and the like.

Vessels 104A-104B may be mobile machines that are configured to carry crew members, passengers, and cargo, and to provide communications network connectivity and onboard services. Although FIG. 1 depicts vessels 104A-104B as aircrafts, vessels 104A-104B may include any type of vessels, including boats, trains, busses, automobiles, cruisers, and the like. Vessels 104A-104B may be configured to provide onboard service such as, for example, access to the Internet and/or inflight entertainment to the passengers.

In some embodiments, vessels 104A-104B include position determination device(s), such as an inertial measurement unit (IMU) or global positioning system (GPS). Such devices, if installed, may allow the vessel to determine its physical location. The location information may be utilized by on-ground system 112 in performing certain functionalities disclosed herein.

Alternatively, other techniques for determining a vehicle's location may be used. For example, in embodiments in which satellites 102A-102B are spot beam satellites, vessels 104A-104B may be able to derive their locations based on the spot beams being used to communicate with the satellite network 116.

In some embodiments, vessels 104A-104B may transmit their position information to on-ground system 112. The position information may be associated with vehicle-specific metrics that are collected near or at the reported position. This may allow on-ground system 112 to correlate particular vehicle-specific metrics with specific network service areas based on the associated position. In some embodiments, location data for one or more of vessels 104A-104B is obtained by the on-ground system 112 from a separate entity or a server not shown in the diagram of FIG. 1. Such an entity or server may receive location data from the vehicle(s) or otherwise derive the location data in some manner.

Vessels 104A-104B may include onboard computer systems and sensor systems configured to collect and monitor metrics data about various events reflecting the onboard services. The metrics data may include information about availability and utilization of network connectivity and/or inflight entertainment services available on vessels 104A-104B. The events may include receiving requests for the Internet connections, data communications sessions, downloading TV programs from content providers, downloading movies from the onboard movie content servers, and the like.

The metrics data collected by the onboard servers of vessels 104A-104B may include, for example, the metrics showing availability and utilization of the network connectivity and inflight services on individual vessels, individual trips, and/or individual portions of the trips. The metrics data may include also web browsing scores, video streaming scores, customer satisfaction scores, and the like. The metrics data may include upload speed metrics, download speed metrics, latency metrics, and the like.

The collected metrics data may be transmitted from the onboard servers of vessels 104A-104B to on-ground systems 112 and/or network performance monitoring units 110A-110B. The metrics data may be transmitted via, for example, network gateways 108A-108B.

Network performance monitoring units 110A-110B may be configured to collect metrics data of onboard service provided on vessels 104A-104B. The metrics data may be collected by network performance monitoring units 110A-110B themselves, by satellites 102A-102B, and/or by vessels 104A-104B. The metrics data may be processed by any of monitoring units 110A-110B, on-ground systems 112, satellites 102A-102B, and/or vessels 104A-104B.

On-ground systems 112 may be configured to process the collected metrics data, aggregate the data, and use the data to generate, for example, past-trips-viewers for visualizing performance indicators of onboard services provided during the past trips that are similar to a particular trip. The past-trips-viewers may be used by operators of the vessel control centers, fleet operators, service providers, and vendors to allow them to access the quality of the onboard services provided during the trips carried on by the vessels.

On-ground systems 112 may include one or more electronic hardware computers or components, including control circuitry configured to perform certain functionalities, as discussed in detail below.

Network gateways 108A-108B may be computer-based systems configured to perform the functionalities of communications modems. The functionalities may include modulation and demodulation of signals communicated between satellites 102A-102B and network performance monitoring units 110A-110B. The functionalities may also include packet queuing, packet acceleration and deceleration, network address translation (NAT), firewall-based security, periodic pinging, and other signal processing functionalities.

Communications network 116 may be implemented as any type of communications network or a group of communications networks. Network 116 may be configured to provide support for a variety of communications protocols, including broadband protocols, wireless protocols, and the like. Network 116 may support two-way communications between gateways 108A-108B, monitoring units 110A-110B, on-ground systems 112, display devices 114, and other computer systems and servers (not shown) implemented in system 100.

On-Ground Systems

In some embodiments, a method for visualizing performance indicators of onboard services provided during similar trips is implemented in one or more on-ground systems. The performance indicators of the onboard services may be visualized using a graphical interface configured to generate and display, for example, a past-trips-viewer depicting status information of communications services provided during one or more past trips that are similar to a particular ongoing trip.

Figure 2:
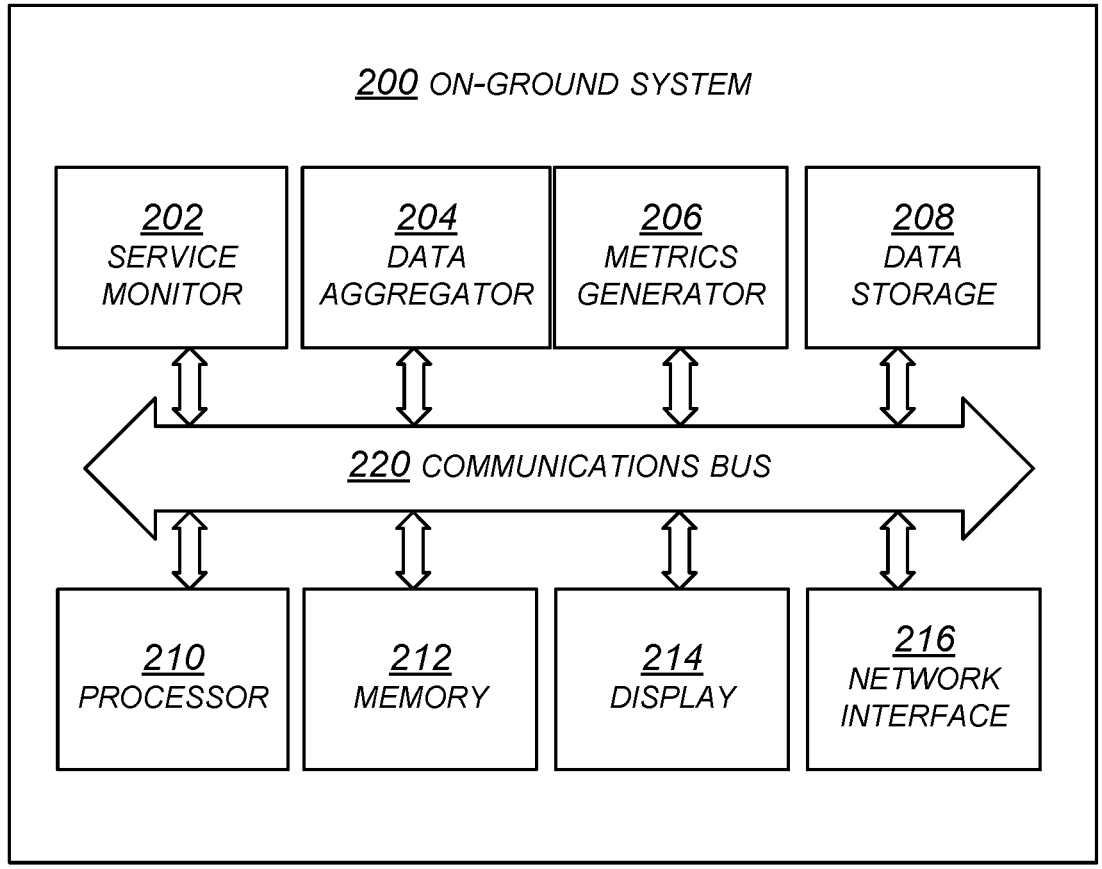
FIG. 2 is an example of a block diagram of an on-ground server in accordance with one or more embodiments.

FIG. 2 is an example of a block diagram of an on-ground server 200 in accordance with one or more embodiments. On-ground system 200 may be, for example, on-ground system 112 described in FIG. 1. On-ground system 200 may be implemented in a computer server or a network of computer servers, such as cloud-based systems and/or virtual compute nodes.

In some embodiments, on-ground system 200 comprises a single hardware computer contained within a single physical enclosure, while in other embodiments, on-ground system 200 is implemented in a plurality of computer installed in multiple physical enclosures, some of which are within a single physical enclosure and others are geographically distributed away from each other. The functionalities described with respect to on-ground system 200 can be distributed among the components of the system 100 of FIG. 1 in a different manner than shown or described herein.

In some embodiments, on-ground system 200 is configured to collect, monitor, aggregate, and otherwise process metrics data indicating performance of one or more service types of onboard service provided in vessels. On-ground system 200 may be configured to use the collected and processed information to generate, for example, past-trips-viewers, particular-trip-viewers, vehicle-data-viewers, trip-data-viewers and other viewers used to visualize performance indicators of onboard services provided during the trips.

On-ground system 200 may be configured to obtain, for example, vessel identifiers of the vessels for which onboard service is to be collected and monitored and status information for the trips carried by the vessels. On-ground system 200 may receive a request to determine one or more past trips that are similar to a particular trip and to obtain performance indicators of onboard services provided during the past trips and the particular trip.

On-ground system 200 may obtain the vessel identifiers using a variety of techniques. For example, on-ground system 200 may request a list of vessel identifiers from a vessel control center of vessel fleet operators and store the list in a storage device of on-ground system 200. On-ground system 200 may use the vessel identifiers as, for example, search keys in queries issued by the on-ground system to request metrics data about the onboard service provided on the corresponding vessels. For example, on-ground system 200 may use a vessel identifier as a search key in a query issued to an onboard server installed in vessel 104A (shown in FIG. 1) to request metrics data about onboard service provided by vessel 104A within a particular time period. In other embodiments, the metric data about the onboard service provided on vessels is automatically provided by the onboard systems implemented in the vessels themselves or obtained from on-ground network performance monitoring units, or in conjunction with the onboard systems implemented in the vessels and the on-ground network performance monitoring units.

In some embodiments, on-ground system 200 comprises one or more service monitors 202, one or more data aggregators 204, one or more performance metrics generators 206, and one or more data storage units 208. System 200 may also include one or more processors 210, one or more memory units 212, one or more display devices 214, and one or more network interface cards 216. The components of on-ground system 200 may communicate with each other directly or indirectly via a communications bus 220. Other embodiments may include fewer or more components.

Display devices 214 may be configured to display visualizations of performance indicators of onboard services provided during similar trips. The visualized performance indicators of the onboard services may be included in, for example, a past-trips-viewer depicting status information of communications services provided during one or more past trips that are similar to a particular ongoing trip. Other viewers may include particular-trip-viewers, vehicle-data-viewers, trip-data-viewers, and the like, all described in detail later.

Display device 214 may be configured to generate a graphical user interface for displaying the viewers in a concise and communicative form. The viewers may indicate the status of onboard service provided on the trips using color objects and/or percentage values, described in detail later. Examples of the graphical representations generated using display 214 are provided in FIG. 6H.

Display 214 may be implemented as an electronic display, such as a CRT display, LCD display, touchscreen, mobile device screen, and the like.

Service monitor 202 may be configured to collect metrics data about various service types of onboard service provided in vessels, shown in FIG. 1. The events may include receiving requests for Internet connections, data communications sessions, TV programs downloads from content providers, movies downloads from the onboard movie content servers, and the like. The events may also include receiving indications that an Internet connection was or was not available in a vessel at a given time, that a data communications session was or was not successfully opened or closed, that a movie was or was not successfully downloaded to a target device operated by the vessel, and the like. Metrics data about the events may be collected as the passengers aboard the vessel, as the vessel travels, as the vessel reaches its destination, and/or as the passengers depart the vessel.

In some embodiments, data aggregator 204 generates an average, maximum, minimum, mean, and/or median of two or more communications service performance metrics for a communications service provided on a vessel for at least one trip of the vessel. Data aggregator 204 may determine negative variances between communication service performance metrics of a vehicle being monitored as it proceeds along its travel route. The negative variances may themselves be aggregated to produce summary metrics representing a difference in performance of a communications service of the monitored vehicle compared to certain performance targets. This may provide threshold values/metrics for evaluating communication service performance. In some embodiments, aggregation of negative variances may be divided by the duration of the given trip to the present point to provide an average negative variance experienced during the trip.

Data aggregator 204 may be configured to process, sort and aggregate the collected and monitored metrics data. Processed data may be sorted and/or aggregated based on service types, vessel identifiers, fleet identifiers, airline identifiers, airport identifiers, and the like. The type of processing performed on the data may depend on a variety of factors. For example, if the data pertains to a trip that a vessel has already completed, then the data may be aggregated based on a type of the data, a type of service that the data represents, a source that provided the data, and the like. However, if the data pertains to an ongoing trip, then the processing may include selecting, from the collected data, the most recently received data reflecting the current-up-to-date availability and utilization of the onboard services.

Metrics generator 206 may be configured to use the sorted and aggregated information to determine performance metrics for determining status for the services provided to passengers while onboard the vessel. The performance metrics may indicate, for example, the performance of one or more service types of onboard services provided on individual vessels, individual trips, and/or individual portions of the trips.

Metrics generator 206 may also be configured to encode the sorted and aggregated data into corresponding status indicators to reflect the performance provided in vessels. In some embodiments, metrics generator 206 determines the status of one or more service types of onboard services provided on selected vessels. The status of the service type may be determined based on metrics data collected for the service type provided on the selected vessels and may include information about the service characteristics of the services provided to the passengers.

The status of a particular service type may, for example, correspond to a value (or a range of values) of the service metrics determined for the particular onboard service. The status may be associated with one or more features of service icons to be displayed in, for example, a past-trips-viewer. Some of the features may be represented numerically as, for example, a single number or a set of metrics values. A single number status for a particular onboard service may be computed as an aggregation of the service metrics data collected for the particular onboard service during a certain time period. A set of metrics values for a particular onboard service may include values determined for the particular onboard service during different trips, and the like. Other features may be represented graphically using, for example, graphical elements such as icons having certain colors, patterns, and the like. A graphical feature for a particular onboard service may correspond to a value or a range of values determined based on the corresponding service metrics for the particular onboard service and may be depicted using a certain icon having a certain color or pattern that graphically represents the corresponding value or the corresponding value-range.

In some embodiments, the status may be determined by metrics generator 206 itself. Alternatively, the status may be provided by satellites 102A-102B, vessels 104A-104B, network gateways 108A-108B, and/or performance monitoring units 110A-110B, shown in FIG. 1.

Service metrics may be stored in data storage 208. Alternatively, or in addition to, the information and the metrics may be communicated to computer servers, such as other on-ground systems 200, and/or computer servers installed in on-ground systems 200. The status and the metrics may be used to generate, for example, a graphical user interface of a past-trips-viewer.

Processors 210 may be configured to provide the execution environment for performing various system-based functions and for performing the methods described herein. Processors 210 may be configured to provide, for example, support for executing an operating system and system functionalities implemented in on-ground system 200.

Memory units 212 may include random access memory (RAM) and read-only memory (ROM) units. Memory 212 may be used to store operating system instructions and computer-readable and computer-executable instructions for implementing the methods described herein.

Network interface card 216 may be configured to facilitate communications between on-ground system 200 and vessels, satellites, network monitoring stations, vessel control centers, vessel operator centers, vendor centers, and the like. The interface may be implemented in hardware, software and/or a combination thereof, and may be implemented to support various communications protocols, including wireless communications protocols, broadband communications protocols, and the like. Network interface 216 may be also used to provide connectivity with input devices (not shown) configured in on-ground system 200. The input devices may include keyboards, smartphones, touchscreens, audio devices, and the like, and may be used to provide inputs, requests for service performance information of onboard services, and the like.

In some embodiments, on-ground system 200 comprises a web server (not shown in FIG. 2). The web server may be a single server or may represent a distributed network of servers across a geographic area. The web server may store instructions for generating and displaying a web-based user interface. The web-based user interface may allow a user to provide user input for configuring one or more threshold values or other performance target data discussed herein. Additionally, the web-based user interface may provide graphical interface data representing values for the metrics collected by the systems/components described herein. The web server may further be configured to generate and/or provide graphical interface data to one or more remote or local monitoring systems for generating a display and/or presentation to a user. The web server may receive indications of user input in connection with a graphical interface. Generation of the graphical interface data may be triggered by the user input indications, as described in detail later.

In some embodiments, a web server may provide web page data to the one or more vessels 104A-104B (shown in FIG. 1) and metrics data collected by data aggregator 204 (shown in FIG. 2). The aggregated metrics may indicate, for example, a number of seconds required, at vessels 104A-104B, to load the web page data provided by the web server.

Web page and/or website content may be copied to, and/or served at, a web server. In this way, communications service performance metrics may be representative of performance of the communications network communicatively connecting on-ground system 200 (shown in FIG. 2) and the monitored vessel, and may not be affected by performance issues that may affect transfer of content from the origin server (e.g., the server that created the website).

Onboard Systems

In some embodiments, a method for visualizing performance indicators of onboard services provided during similar trips uses the information provided by vessels 102A-102B and/or onboard systems implemented and installed in the vessels themselves.

In some embodiments, onboard servers installed in vessels are used to collect service metrics data for the service type(s) of onboard services provided on the vessels and to transmit the collected metrics data from the onboard servers to the on-ground servers, which in turn, use the received metrics data to determine the status of each service type to generate, for example, a past-trips-viewer.

Figure 3:
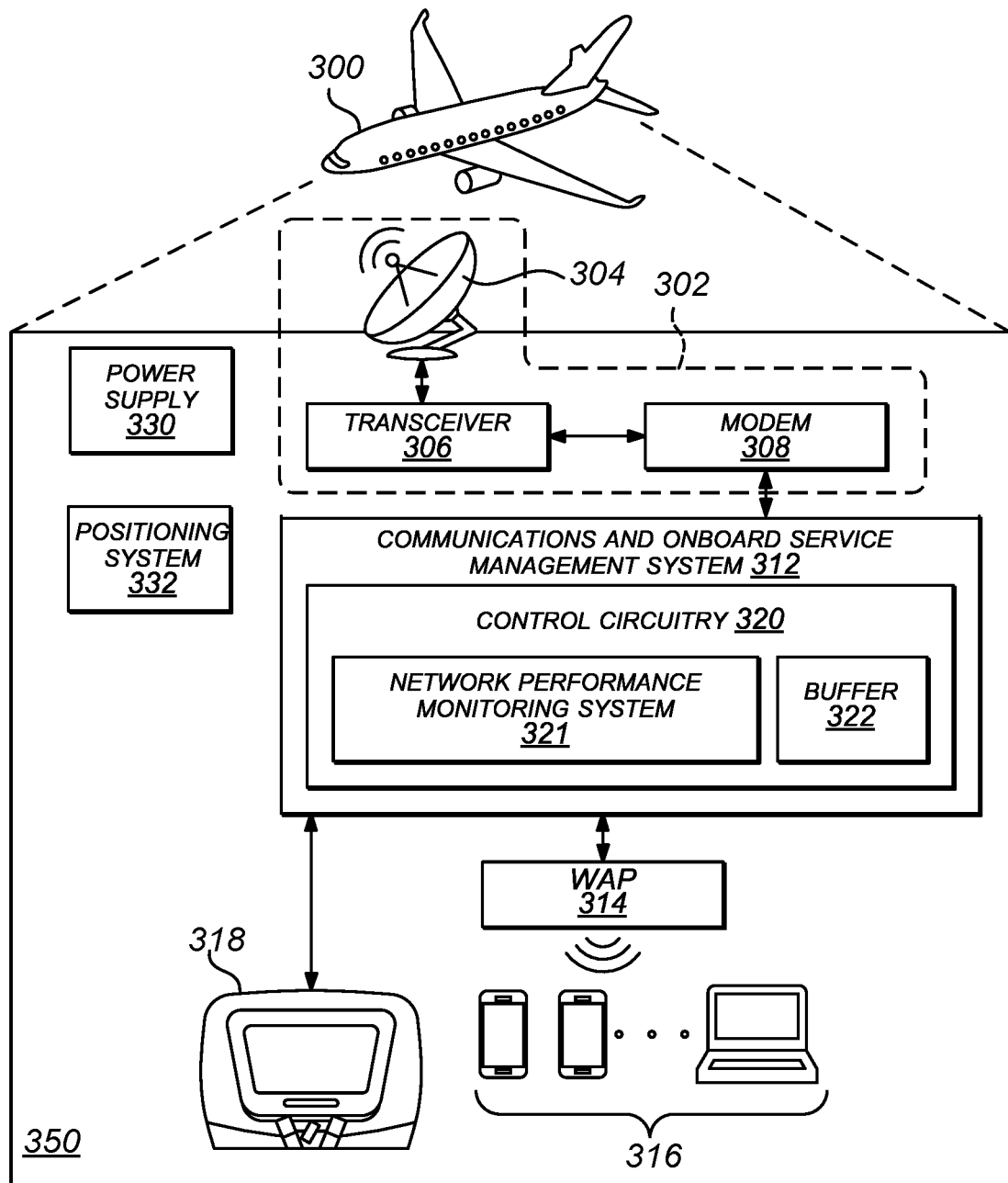
FIG. 3 is an example block diagram of an onboard system in accordance with one or more embodiments.

FIG. 3 is an example block diagram of an onboard system in accordance with one or more embodiments. The example depicted in FIG. 3 shows a vessel 300 which is an aircraft; however, in other embodiments, vessel 300 may correspond to a helicopter, cruise ship, bus, train, and the like. To provide simple examples, it is assumed that vessel 300 depicted in FIG. 3 corresponds to any vessel 104A-104B, shown in FIG. 1.

In some embodiments, vessel 300 comprises an onboard system 350. Onboard system 350 may be configured to collect metrics data of the service type(s) of onboard services provided on vessel 300. Onboard system 350 may be also configured to transmit the collected metrics data to on-ground system, such as on-ground system 200 shown in FIG. 2. The collected metrics data may be associated with a unique identifier of vessel 300 (also referred to herein as a vessel identifier, or a vessel ID) by the onboard system 350, and/or by the on-ground network performance monitoring unit of the onboard system.

If vessel 300 corresponds to an aircraft, then the identifier may include an aircraft tail identifier (ID), a nose ID, an aircraft serial number, or the like. The identifier may be configured, or hard-coded, in a computer system implemented in vessel 300. Additional information associated with the vessel may include a trip number such as a flight number, a travel segment number such as a route number, crew identifiers of crew members of vessel 300, equipment identifiers such as serial numbers of antennas or network devices, an origination terminal identifier, a destination terminal identifier, a scheduled departure time, a scheduled arrival time, and the like.

In some embodiments, vessel 300 includes various hardware components, software components, and/or combinations thereof. For example, vessel 300 may include one or more antennas 304, one or more transceivers 306, one or more modems 308, a communications and onboard service management system 312, one or more wireless access points ("WAPs") 314, as well as one or more onboard media clients implemented in one or more personal target devices 316, and/or one or more passenger seatback media systems 318. Vessel 300 is also equipped with a power supply unit 330 and a positioning system 332.

Antenna 304, transceiver 306, and modem 308 may be collectively referred to as a two-way communications system 302. System 302 may be configured to facilitate bidirectional communications with satellites, such as satellites 102A-102B shown in FIG. 1.

Communications system 302 may be configured to support bidirectional data communications between communications networks such as the Internet, and target devices 316, seatback media systems 318, positioning system 332, and the like. For example, system 302 may be configured to provide uplink data received from target devices 316 and/or seatback systems 318 to modem 308 to allow generating modulated uplink data in the form of a transmit intermediate frequency (IF) signal. System 302 may also support the reception of a forward downlink signal from a satellite (or other system such as an air-to-ground system) and the transmission of a return uplink signal back to the satellite (or other system such as an air-to-ground system) to support the bidirectional communications.

Antenna 304 may be configured to communicate signals between vessel 300 and satellites or other systems (not shown in FIG. 3). The signals may be communicated via one or more communications links (not shown). Antenna 304 may be mounted to an elevation and azimuth gimbal which points antenna 304 toward the satellite and allows actively tracking the satellite.

Modem 308 may be implemented as a separate component, as shown in FIG. 3, or may be integrated with network performance monitoring system 321 of communications and onboard service management system 312. Modem 308 may be configured to generate modulated uplink data based on the uplink data received from communications and onboard service management system 312. The modulated IF signal may be delivered to transceiver 306.

Transceiver 306 may be configured to convert and then amplify the modulated uplink data to generate a return uplink signal and transmit the amplified signal via antenna system 304 to one or more satellites. Transceiver 306 may be also configured to receive, via antenna system 304, a forward downlink signal from the satellites. Transceiver 306 may, for example, amplify and down-convert the forward downlink signal and generate modulated downlink data, such as a receive IF signal, to be then demodulated by modem 308. The demodulated downlink data may be then provided from modem 308 to communications and onboard service management system 312 for routing to target devices 316 and/or seatback systems 318.

Target devices 316 may include smartphones, laptops, tablets, iPods, PDAs, netbooks, and the like, that have been brought onto vessel 300 by passengers and crew members. Target devices 316 and/or seatback systems 318 may communicate with communications and onboard service management system 312 via communication links (not shown) which may be wired and/or wireless. The communications links may be part of a local area network (LAN) or a wireless area network (WLAN) supported by WAPs 314. WAPs 314 may be installed in various locations of vessel 300 and may be configured to provide the traffic switching and routing functionalities.

Positioning system 332 may include Global Positioning System (GPS) circuitry configured to determine a present location or position of vessel 300. Positioning system 332 may receive positioning information from sensors installed throughout vessel 300. The position information may include readings of altitude, longitude, latitude, elapsed distance from an origination terminal, and the like. In some embodiments, each position reading is associated with a corresponding time value corresponding to the time at which vessel 300 was at a particular position, and at which the particular position value was recorded.

Particular-Trip-Viewers and Past-Trips-Viewers

In the context of the present approach, a particular trip is an ongoing trip for which a particular-trip-viewer and a past-trips-viewer depicting the similar past trip (i.e., already completed trips) are generated and displayed using a graphical user interface. Both viewers may be generated automatically when a user requests a trip detail view for a particular trip.

In some embodiments, upon receiving a request for a trip detail view for a particular trip, a system implementing the presented approach may generate a graphical user interface to display a particular-trip-viewer for the particular trip and a past-trips-viewer that shows a graphical representation of the past trips that are similar to the particular trip. The process of collecting the information to be presented in the viewers is described later. Similarity between the trips is described in detail in FIG. 6A. Non-limiting examples of the trips are the flights carried by aircrafts, helicopters, and the like.

In some embodiments, the particular-trip-viewer depicts, among other things, an additional icon that indicates status of onboard services provided during the particular trip, while the past-trips-viewer depicts, among other things, status of onboard services provided during each of the past trips that are similar to the particular trip. For example, suppose that the characteristic used to determine similarity between the trips is a trip departure time, and the onboard service that is monitored is the quality of in-flight communications (IFC) service. In this example, the particular-trip-viewer may depict, among other things, the additional icon that indicates the status of IFC services provided during the particular trip, while the past-trips-viewer may depict status of IFC onboard services provided during each of the past trip that had the similar departure time as the particular trip.

Information depicted in the particular-trip-viewer and the past-trips-viewer may be provided by, for example, on-ground system such on-ground system 200 described in FIG. 2, which corresponds to on-ground system 112 described in FIG. 1. Alternatively, in rare situations, the information may be provided by an onboard system, such as onboard system 350 described in FIG. 3.

An on-ground system may be configured to collect, monitor, aggregate, and otherwise process metrics data indicating performance of one or more service types of onboard service provided in vessels. The on-ground system may be configured to use the collected and processed information to generate, for example, past-trips-viewers, particular-trip-viewers, past-vehicle-viewers, past-trip-viewers and other viewers used to visualize performance indicators of onboard services provided during the trips. The on-ground system, such as on-ground system 200 described in FIG. 2, comprises one or more service monitors 202, one or more data aggregators 204, one or more performance metrics generators 206, and one or more data storage units 208. Service monitors 202 may be configured to, for example, collect metrics data about various service types of onboard services provided in vessels, shown in FIG. 1. This may include receiving requests for Internet connections, data communications sessions, TV programs downloads from content providers, movies downloads from the onboard movie content servers, and the like. Data aggregators 204 may be configured to generate an average, maximum, minimum, mean, and/or median of two or more communications service performance metrics for a communications service provided on a vessel for the trips performed by the vessel. Data aggregators 204 may be configured to process, sort and aggregate the collected and monitored metrics data. Processed data may be sorted and/or aggregated based on service types, vessel identifiers, fleet identifiers, airline identifiers, airport identifiers, and the like. Metrics generators 206 may be configured to use the sorted and aggregated information to determine performance metrics for determining status for the services provided to passengers while onboard the vessel. The sorted and aggregated information may be used by service monitors 202 to determine similarities between the trips, as well as providing the information for the particular-trip-viewers and the past-trips-viewers.

Examples of Particular-Trip-Viewers and Past-Trips-Viewers

Figure 4A:
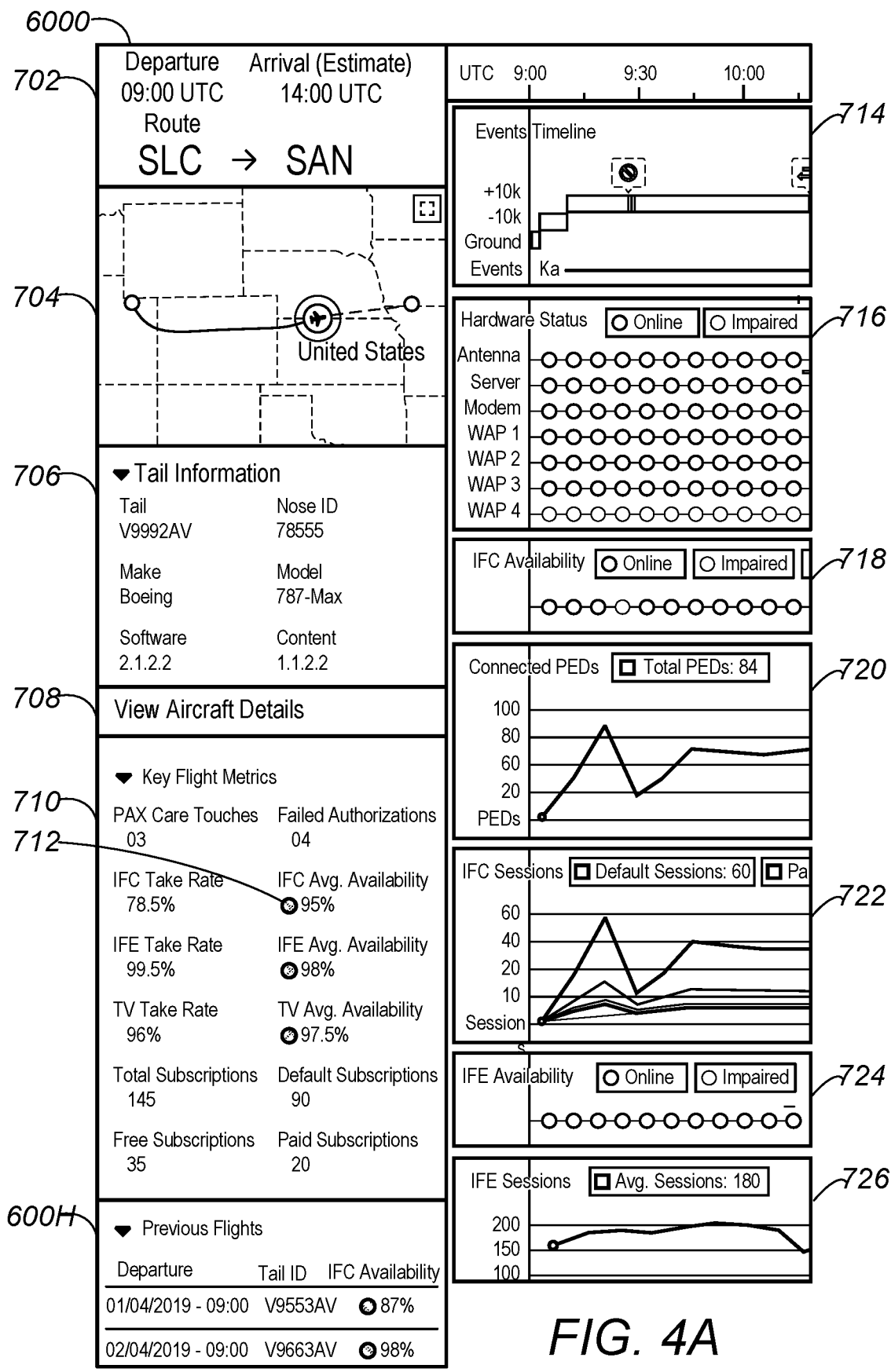
FIG. 4A is an example of a graphical interface depicting an example detail trip viewer for a particular trip and an example past-trips-viewer comprising performance indicators of onboard services provided during past trips that are similar to the particular trip in accordance with one or more embodiments.

FIG. 4A is an example of a graphical interface depicting an example particular-trip-viewer for a particular trip and an example past-trips-viewer comprising performance indicators of onboard services provided during the past trips that are similar to the particular trip in accordance with one or more embodiments. The depicted examples of the particular-trip-viewer and the past-trips-viewer are some of many possible depictions of the information that may be shown for the particular trip and for the past trips that are similar to the particular trip. In other implementations, the viewers may be arranged differently and may depict the information in the forms that are different than those shown in FIG. 4A.

The examples depicted in FIG. 4A include a particular-trip-viewer 6000 for a particular trip and a past-trips-viewer 600H for past trips that are similar to the particular trip. The depicted arrangements for each of the viewers should be viewed as examples of many different ways of arranging the content of the viewers.

Particular-trip-viewer 6000 for a particular trip may depict various information specific for the particular trip. For example, particular-trip-viewer 6000 may include a trip identification window 700 that shows a departure time of the particular trip, an estimated arrival time of the particular trip, a code of the airport from which the flight departed, and a code of the airport at which the trip will end. In the depicted example, the flight took off from Salt Lake City (SLC) airport at 9 UTC and was estimated to end at San Diego (SAN) at 14 UTC.

Particular-trip-viewer 6000 may also depict a map 704, which graphically represents a flight path from the departing airport to the destination.

Particular-trip-viewer 6000 may further depict a tail information window 706 which may provide a tail identification of the vehicle used during the particular trip, a make of the vehicle, a model, a version of the software implemented on the vehicle, and a version of the content. Other information may also be presented in that window.

Furthermore, particular-trip-viewer 6000 may depict a key flight metrics window 710. Window 710 may include flight metrics information about various onboard services provided during the particular trip. Suppose that the characteristic used to determine similarity between the trips is a trip departure time, and the onboard service that is monitored is the quality of in-flight communications (IFC) service, then window 710 may depict, among other things, an icon (also referred herein as an additional icon) 712 that indicates the status of IFC services provided during the particular trip, while past-trips-viewer 600H may depict status of IFC onboard services provided during each of the past trip that had the similar departure time as the particular trip. In the example depicted in FIG. 4A, icon 712 indicates that the IFC onboard services were 95% of the time available during the particular trip. As will be described in detail later, past-trips-viewer 600H may show a few past trips (already completed) that departed at the time similar to the departure time of the particular trip. For each of the past trips depicted in past-trips-viewer 600H, the viewer may depict a departure time, a vehicle tail identifier of the vehicle used during the trip and an IFC availability performance indicator. Details are described in FIG. 4B.

Referring again to particular-trip-viewer 6000, the viewer may also include an events timeline window 714, a hardware status window 716, an IFC availability window 719, an IFC sessions window 722, an IFE availability window 724, and IFE sessions window 726.

The windows 702-726 may depict information that is specific to the particular trip and may not necessarily appear in each implementation. Some other implementations may include additional windows, while other implementations may include fewer windows.

Determining Similarities Between Trips

Similarity between a particular trip (i.e., an ongoing trip) and a past trip (i.e., an already completed trip) may be determined using a variety of approaches. In some embodiments, determining similarity between a particular trip and a past trip may include comparing a characteristic of the particular trip with a characteristic of the past trip to determine whether the corresponding characteristics are similar. This may include checking whether the characteristic of the past trip and the characteristic of the particular trip meet a condition used to determine the similarity between the trips.

The process of identifying similar flights may include identifying a set of similar past flights that meet the condition. The set of past flights may then be sorted to create an ordered list based on one or more criteria. In some embodiments, a certain number of the past flights at a top of the ordered list may be selected for inclusion in the past trip viewer. For example, in FIG. 4B, the set of similar past flights are those flights that have the same departure and destination. The set is then sorted based on their departure time, and the ten most recent past flights can then be selected for inclusion in the past trip viewer.

Depending on the type of the characteristics, this may include, for example, determining whether the corresponding characteristics are the same, or whether the corresponding characteristics are within a predetermined time interval, or whether the corresponding characteristics are within a predetermined distance. Detail examples are described below.

Each trip may have assigned a plurality of characteristics. The characteristics may be obtained by, for example, an on-ground system, like on-ground system 200 depicted in FIG. 2, which may correspond to on-ground system 112 depicted in FIG. 1.

Examples of Similar Trips

Figure 6A:
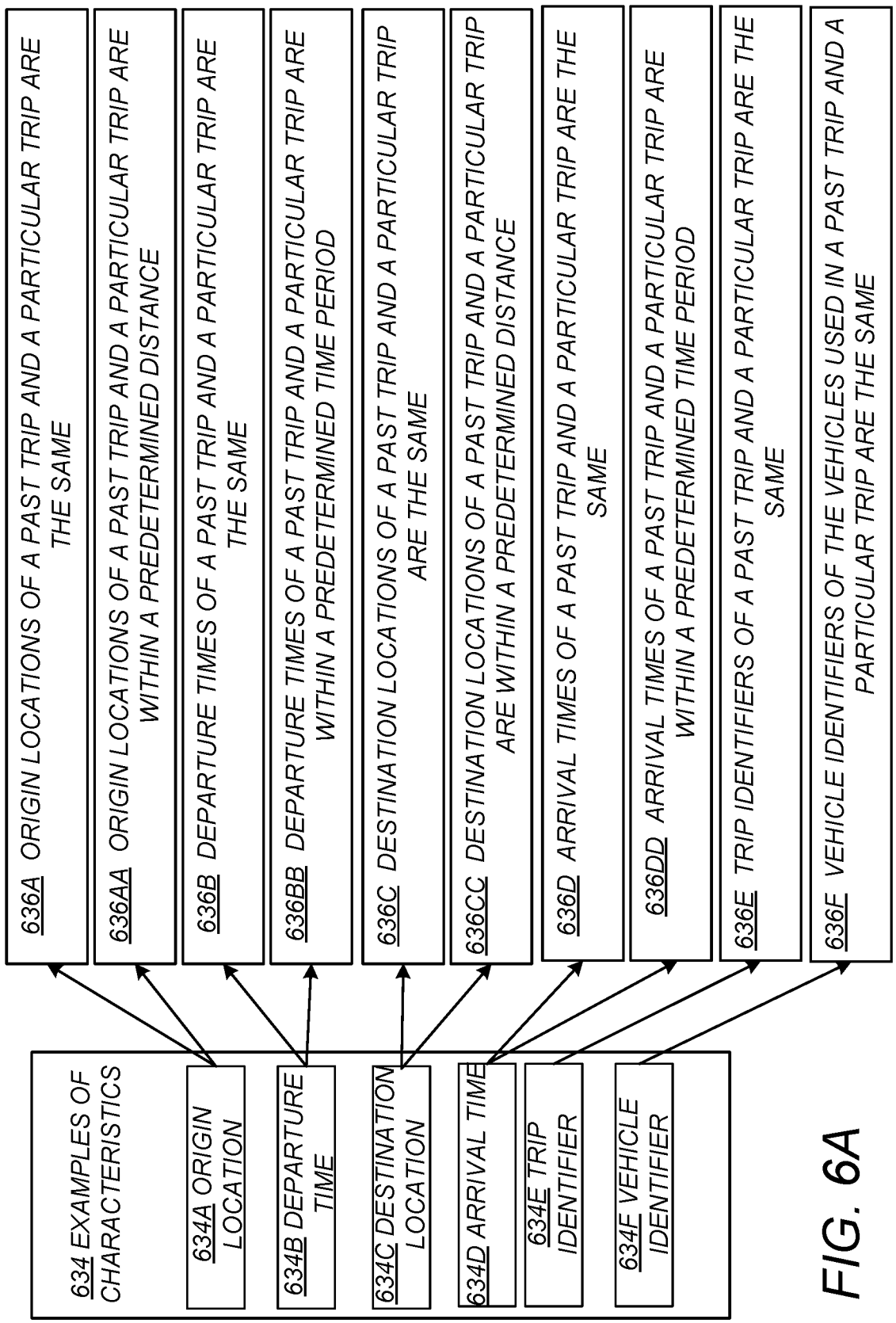
FIG. 6A depicts examples of trip characteristics and examples of conditions used to determine similarities between trips.

FIG. 6A depicts examples of trip characteristics 634 and examples of conditions 636A-636F used to determine similarities between trips. In some embodiments, examples of trip characteristics 634 include: an origin location 634A of the trip, a departure time 634B of the trip, a destination location 634C of the trip, an arrival time 634D of the trip, a trip identifier 634E, and a vehicle identifier 634F of the vehicle used in the trip. In other embodiments, additional characteristics may also be considered in determining whether a past trip and a particular trip are similar. The correspondence between trip characteristic 634A-634F and conditions 636A-636F is depicted in FIG. 6A using arrows.

In some embodiments, example conditions 636A-636F are used to determine whether a past trip and a particular trip are similar. Typically, one of the conditions 636A-636F is preselected and used to determine the similarity between the trips. The selection of the condition used to determine the similarity between the trips may be modified or overwritten by an operator of, for example, a trip management system.

In FIG. 6A, according to a condition example 636A, a past trip is similar to a particular trip if both trips originated at the same location. An origin location of a trip may correspond to an airport at which the trip was originated. According to a condition example 636AA, a past trip is similar to a particular trip if an origin location of the past trip and an origin location of the particular trip are within a predetermined distance. A predetermined distance may be expressed in miles, tens of miles, and the like.

According to a condition example 636B, a past trip is similar to a particular trip if both trips have the same departure time. A departure time of a trip may be indicated using a date, a time, a date/time, a month, a year, and the like. According to a condition example 636BB, a past trip is similar to a particular trip if a departure time of the past trip and a departure time of the particular trip are within a predetermined time period. A predetermined time period may be expressed in minutes, hours, and the like.

According to a condition example 636C, a past trip is similar to a particular trip if both trips are destined to the same location. A destination location of a trip may correspond to an airport at which the trip ends. According to a condition example 636CC, a past trip is similar to a particular trip if a destination location of the past trip and a destination location of the particular trip are within a predetermined distance. A predetermined distance may be expressed in miles, tens of miles, and the like.

According to a condition example 636D, a past trip is similar to a particular trip if both trips have the same arrival time. An arrival time of a trip may be indicated using a date, a time, a date/time, a month, a year, and the like. According to a condition example 636DD, a past trip is similar to a particular trip if an arrival time of the past trip and an arrival time of the particular trip are within a predetermined time period. A predetermined time period may be expressed in minutes, hours, and the like.

According to a condition example 636E, a past trip is similar to a particular trip if a trip identifier of the past trip is the same as a trip identifier of the particular trip. A trip identifier may be an encoded identifier assigned to a trip by the airlines, the airport, and the like. According to a condition example 636F, a past trip is similar to a particular trip if a vehicle identifier of the vehicle used during the past trip is the same as a vehicle identifier of the vehicle used during the particular trip. Examples of a vehicle identifier include a vehicle tail ID, a nose ID, an aircraft serial number, and the like.

In some other embodiments, additional conditions may be used to determine similarity between trips. For example, in some implementations, the conditions use more than one characteristic. Examples of such conditions may include a condition that checks both departure times for the trips and arrival times for the trips. Another example of such conditions includes a condition that checks both departure times for the trips and vehicle identifiers of the vehicles used during the trips. Other conditions may include additional characteristics of the trips that have been not depicted in FIG. 6A.

Past-Trips-Viewers Visualizing Performance Indicators of Onboard Services Provided During Similar Past Trips In some embodiments, a past-trips-viewer indicates the status of onboard services provided during past trips that are similar to a particular trip. The viewer may be generated and displayed using a graphical interface. The graphical interface may be executed as, for example, part of service monitor 202 of on-ground system 200 described in FIG. 2, or part of network performance monitoring system 321 of communications and onboard service management system 312 described in FIG. 3.

In general, a past-trips-viewer may include information about one or more past trips that have been determined as similar to a particular trip. A particular trip may be an ongoing trip, while a past trip may be a trip that has been already completed. Similarity between a past trip and a particular trip may be determined using a variety of approaches, some of which are described in FIG. 6A.

FIG. 4B is an example of a graphical user interface for generating and displaying a past-trips-viewer 600H for past trips that are similar to a particular trip. In the example depicted in FIG. 4B, past-trips-viewer 600H is represented as a two-dimensional table. However, in other implementations, past-trips-viewers may be represented in the forms other than tables.

In some embodiments, contents of past-trips-viewer 600H may include a header 603 and information about past trips that are similar to a particular trip. The information about the past trips may be organized in rows, where each row corresponds to one past trip, and where the information about each past trip is depicted according to labels included in header 603 of past-trips-viewer 600H.

In some embodiments, past-trips-viewer 600H includes an optional viewer identification. The viewer identification may include various types of information and may be arranged in many different ways. The viewer identification shown in FIG. 4B includes a name of the viewer and a graphics object 600 that may include any type of graphics or image. The name of the viewer shown in FIG. 4B is "Previous Flights;" however, in other examples, the viewer's name may be different, or may be omitted altogether. In the example depicted in FIG. 4B, graphics object 600 is a circle filled in with a texture pattern. In other examples, other graphics objects may be included.

Header 603 of past-trips-viewer 600H may include various labels and may be arranged in a variety of ways. In the example depicted in FIG. 4B, header 603 includes a "DEPARTURE" label 602, a "TAIL ID" label 611, an interactive toggle 612, and an onboard service type "IFC AVAILABILITY" label 614. In this example, the "DEPARTURE" is an example of a past trip characteristic, the "TAIL ID" is a vehicle identifier, and "IFC AVAILABILITY" is an example of an onboard service.

Onboard service type 614 may correspond to the type of the onboard service for which the status information is displayed in past-trips-viewer 600H. If, however, an operator wants to change the type of the onboard service for which the status information is to be displayed in past-trips-viewer 600H, then the operator may select another type of the onboard service from, for example, a menu (not shown) provided to the operator. The available types of onboard services may include "IFC AVAILABILITY," "DEFAULT COMMUNICATIONS SESSIONS", "PAID SESSIONS," "MESSAGING SESSIONS," "FREE SESSIONS," "WI-FI SESSIONS," "TV SESSIONS," "DATA USAGE," and the like Usually, a vessel is assigned a plurality of vessel identifiers. In some embodiments, the vessel identifier types include a tail ID, a nose ID, and an aircraft serial number. While some customers may refer to the vessel by the vessel's tail ID, some other customers may refer to the same vessel by the vessel's nose ID.

Toggle 612 may be used to select/change a vessel's identification type of a vessel identifier from a set of vessel identifier types. For example, by pressing a right-arrow of toggle 612, a next vessel identifier type of a vessel identifier may be selected from the set and the selected identifier type may be displayed in the field 611, while by pressing a left-arrow of toggle 612, a previous identifier type may be selected from the set and the selected identifier type may be displayed in the field 611. Each scrolling through the set of the vessel identifier types may cause an update of the vehicle identifiers in a column below field 611 and according to the selected vehicle identifier type.

Arrangements of columns of past-trips-viewer 600H may vary and may depend on the implementation. Typically, an arrangement of past-trips-viewer 600H is determined by the order of the labels included in header 603 of past-trips-viewer 600H.

In the example depicted in FIG. 4B, a first column of past-trips-viewer 600H is labeled with a "DEPARTURE" label 602, and therefore, the content of that column includes the departure dates/times of the corresponding past trips.

A second column of past-trips-viewer 600H shown in FIG. 4B is labelled with a "TAIL ID" label 611, and therefore, the content of the second column includes the tail identifiers of the vehicles used during the corresponding past trips. If a vehicle identifier type is changed, using, for example, toggle 611, from a vehicle tail ID to, for example, a vehicle nose ID, then the corresponding nose IDs of the vehicles used during the corresponding past trips are displayed in the second column.

A third column of past-trips-viewer 600H shown in FIG. 4B may be labelled using the name of the onboard service that is being monitored. Suppose that the monitored onboard service is IFC availability. In the example of FIG. 4B, the third column is labelled with a "IFC AVAILABILITY" label 614, and therefore, the content of the third column includes status of IFC onboard services provided during the past trips. If a type of the onboard services is changed or otherwise modified to another onboard service type, then the corresponding status information of another onboard service type of the corresponding past trips is displayed in the third column. For example, if a "TV SESSION AVAILABILITY" is selected as a key performance indicator of onboard services, then the label of the third column may be changed to a "TV SESSION AVAILABILITY" label, and the content of the third column of past-trips-viewer 600H may be updated to include status information of the onboard TV sessions provided on the corresponding past trips.

In some embodiments, status of onboard services provided on a past trip is depicted in past-trips-viewer 600H as an icon that has one or more visual features. The one or more visual features of the icon may vary from one embodiment to another, and may, for example, include one or more of a color object and/or an alphanumeric string representing the status. For example, one feature of an icon may include a color circle to graphically indicate whether the status of the onboard services provided during a past trip is excellent, good, fair or poor. The circle may have an associated color or an associated texture pattern that allows distinguishing the status of the onboard services for the trips based on the colors or patterns of the corresponding circles. For example, a green circle may depict an excellent status that may range from 100% to 96%, a yellow circle may depict a good status that may range from 95% to 78%, an orange circle may depict a fair status that may range from 77% to 70%, and a red circle may depict a poor status that may range from 69% to 0%. Other color schemes and other status ranges may also be implemented.

Other features of an icon may include an alphanumeric string to numerically indicate as a percentage of time that network service was available to the communications service management system during the past trip.

Referring again to FIG. 4B, a past trip that has a departure date/time indicated in a field 604, and a tail ID V943AV indicated in a field 616, has an icon comprising two features: a circle 618 and a numerical value of 99% shown in a field 620. Since the value in field 620 is 99%, which is excellent, circle 618 has assigned a texture pattern that indicates an excellent status of the onboard services provided during the particular past trip. Another example of a past trip that has an excellent performance indicator is a trip that has a departure date/time indicated in a field 608.

However, a past trip that that has a departure date/time indicated in a field 606, and a tail ID V943AV, has an icon that has a circle 622 and a numerical value of 95% in a field 624. Since the value in field 624 is 95%, which is good but not excellent, circle 622 has assigned a texture pattern that indicates a good status of the onboard services provided during the particular past trip.

Other texture patterns may be assigned to the circles that represent a fair status or a poor status. For example, a circle 626 has assigned a texture pattern that indicates a fair status of the onboard services provided during a corresponding past trip (as shown by 72% in a field 628), while a circle 630 has assigned a texture pattern that indicates a poor status of the onboard services provided during a corresponding past trip (as shown by 69% in a field 632).

Although not shown in FIG. 4B, in some embodiments, a graphical interface also generates and displays a particular-trip-viewer (not shown) that comprises an icon (also referred herein as an additional icon) for the particular trip. The additional icon displayed in the particular-trip-viewer may be used to indicate the status of onboard services provided during the particular trip. The additional icon may have one or more features indicating the status of a corresponding onboard service provided during the particular trip. The features may include, for example, a percentage value representing an actual value of the performance indicators of the onboard service provided during the particular trip and a circle having a color corresponding to the status range(s).

One of the benefits of visualizing performance indicators of onboard services in past-trips-viewer 600H and a particular-trip-viewer (not shown) in a simple and communicative way is to allow for an easy comparison of the performance indicators of the past trips and the performance indicator for the particular trip. Displaying both past-trips-viewer 600H and the particular-trip-viewer (not shown) may be used to indicate and compare the quality of onboard services provided during the particular trip and the quality of onboard services provided during the past trips. For example, a performance indicator of the onboard services provided during a particular trip depicted in a particular-trip-viewer may be compared with the performance indicators of the onboard services provided during past trips depicted in past-trips-viewer 600H. The comparison may be used to determine whether the quality of the onboard services provided during the particular trip and the past trips has been diminishing and if so, what might have been the source of the diminished quality. For example, the status of the onboard service provided during the particular trip may be compared with the status of the same onboard service provided on the similar past trips to allow a user to quickly access whether the service issues related to the particular trip may be caused by network-related issues, the past trips' issues, the particular trip' issues, and the like.

Interactivity Capabilities—Generating a Past-Vehicle-Viewer

In some embodiments, past-trips-viewer 600H implemented in a graphical interface provides interactivity capabilities with respect to the content displayed in the interface.

FIG. 5A is an example of a graphical interface for depicting a past-vehicle-viewer showing information about a vehicle used during a past trip and generated when a pointing device is hovering over a past vehicle identifier of the past trip shown in the past-trips-viewer in accordance with one or more embodiments.

Suppose that a graphical interface application detected that a pointing device is hovering over a vehicle identifier associated with a past trip and displayed in a past-trips-viewer. The hovering is equated herein with selecting (step 555) the vehicle identifier. In response to selecting the vehicle identifier of the past trip from the past-trips-viewer, the graphical user interface application may request from, for example, an on-ground system, information about a vehicle that is identified by the selected vehicle identifier and that was used during the past trip. Upon receiving that information, the application may generate and display a past-vehicle-viewer 500 that depicts the information about the vehicle used during the past trip.

Past-vehicle-viewer 500 may include various details about the past vehicle. An example of past-vehicle-viewer 500 is shown in FIG. 5A merely to illustrate one of many possible past-vehicle-viewers that may be implemented herein.

Example Past-Vehicle-Viewer

Referring again to FIG. 5A, graphical interface 500 and/or associated interface data may be generated in response to receiving a user input that corresponds to hovering a pointing device, such as a cursor, over a vehicle identifier of a past trip shown in past-trips-viewer 600H.

Vehicle data interface 500 may include a vehicle health table 502, which may comprise a vehicle identifier 504, data related to open cases 506, data related to equipment swaps 508, and/or data related to passenger contacts 510.

Cases 506 may be any reports generated by passengers and/or personnel associated with a vehicle. A case 506 may represent a reported problem associated with the vehicle, for example. The number of cases 506 opened for the vehicle may be included in vehicle health table 502, while a list of cases reported within a given period of time may be included in a cases table 522. Each listed case may have an identification number, a type, a category, and a subject. Case table 522 may further include progress information for each case, for example a priority level, a status, a date/time created, and a most recent status date/time.

Vehicle data interface 500 may further include a hardware device table 512, which may comprise a variety of data related to individual hardware devices of the vehicle. For example, the listed hardware devices may be associated with the communication service provided onboard the vehicle. Each device may be provided in connection with a data entry comprising one or more of the associated device name, identification number, status, hardware information (which may include a part number and/or revision number), software information (which may include a revision number), and firmware (which may include a revision number).

Information included in vehicle data interface 500 may be useful in diagnosing issues with a vehicle. For example, a large number of cases opened for a vehicle may indicate a possible issue, and certain responsive measures may be taken. For example, equipment installed in the vehicle may be replaced based on vehicle data presented in vehicle data interface 500. Using equipment status information on vehicle device table 512 may indicate whether replacing of equipment has corrected a known issue.

Referring again to FIG. 5A, vehicle data interface 500 may further include performance data associated with a communications service provided on a vehicle during one or more previous trips of the vehicle. The performance data may be vehicle-specific performance data and/or trip-specific data.

In some embodiments, the performance data may indicate one or more metrics, the one or more metrics including one or more of a number or average number of dropped packets, average throughput or delays during a time period, an availability of the communications service during a time period, data rate, signal quality values, latency, packet loss rate, and a maximum number of PEDs connected, with respect to the communications service during one or more previous trips of the vehicle. In some embodiments, the availability of network service may be represented as a percentage of time that network service was available to the communications service management system during the one or more previous trips of the vehicle. In some embodiments, the vehicle-specific performance data may indicate an availability of one or more of uplink and/or downlink communications.

Interactivity Capabilities—Generating a
Past-Trip-Viewer

In some embodiments, past-trips-viewer 600H implemented in a graphical interface provides interactivity capabilities with respect to the content displayed in the interface.

Figure 5B:
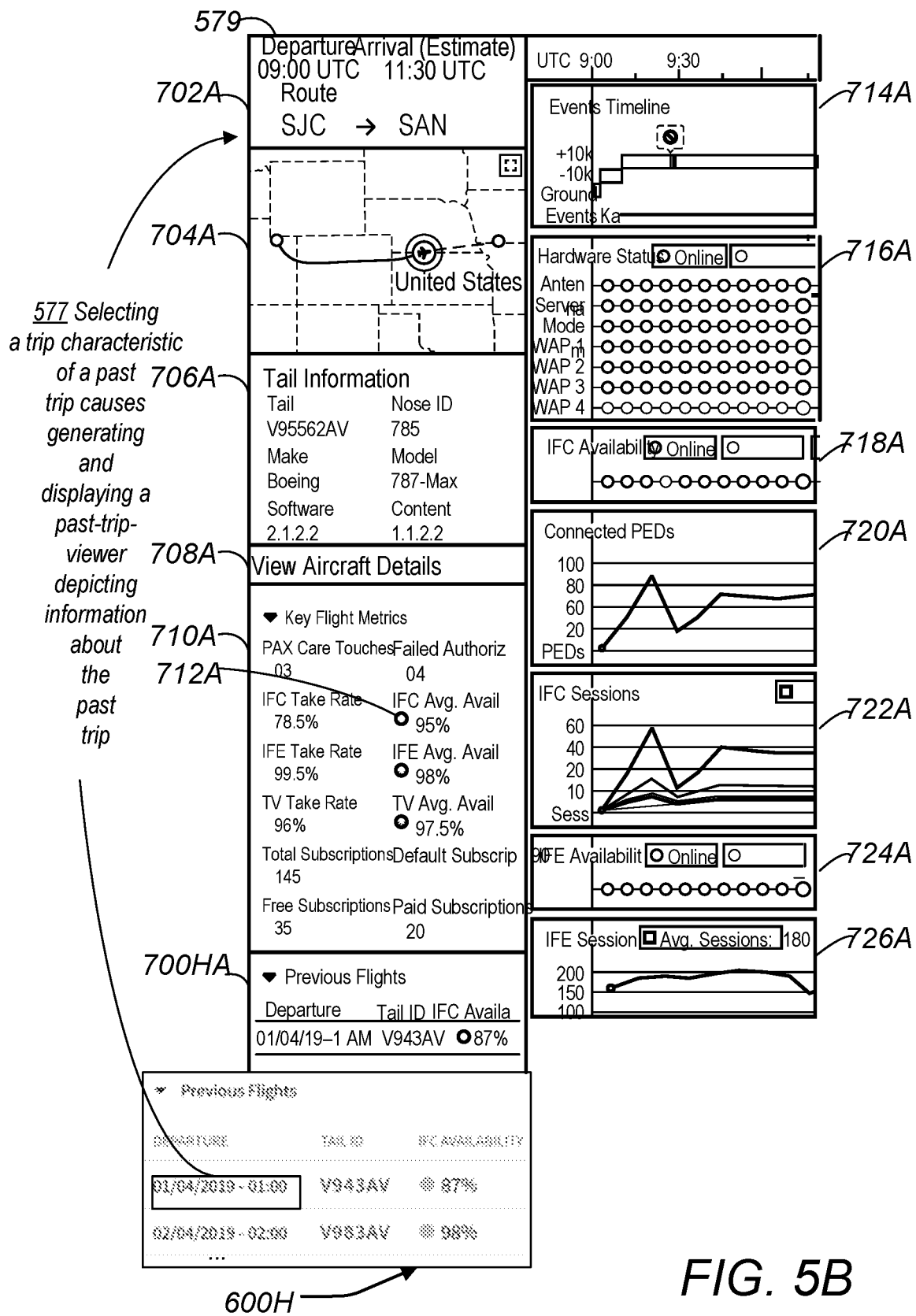
FIG. 5B is an example of a graphical interface for depicting a particular-past-trip viewer showing information about a past trip and generated when a pointing device is hovering over a past-trip-characteristic shown in a past-trips-viewer in accordance with one or more embodiments.

FIG. 5B is an example of a graphical interface for depicting a particular-past-trip viewer showing information about a past trip and generated when a pointing device is hovering over a past-trip-characteristic of a particular past trip shown in the past-trips-viewer in accordance with one or more embodiments. Suppose that a graphical interface application detected that a pointing device is hovering over a past-trip-characteristic of a past trip displayed in the past-trips-viewer and associated with a past trip. The hovering is equated herein with a selection (step 577) of the past-trip-characteristic, and subsequently with a selection of the corresponding past trip. In response to selecting the past-trip-characteristic of the past trip from the past-trips-viewer, the graphical user interface application may request from, for example, an on-board system, information about the past trip. Upon receiving that information, the application may generate and display a past-trip-viewer 579 that depicts the information about the past trip.

Past-trip-viewer 579 may include various details about the past trip. An example of past-trip-viewer 579 is shown in FIG. 5B merely to illustrate one of many possible past-vehicle-viewers that may be implemented herein.

Example Past-Trip-Viewer

Referring again to FIG. 5B, past-trip-viewer 579 and/or associated interface data may be generated in response to receiving a user input corresponding to hovering a pointing device, such as a cursor, over a past trip characteristic of a past trip shown in past-trips-viewer 600H.

In some embodiments, to some extent, past-trip-viewer 579 shown in FIG. 5B is similar to particular-trip-viewer 6000 shown in FIG. 4A; that, however, may not necessarily be the case in each implementation. For example, windows 700A-726A of past-trip-viewer 579 may depict information that is specific to the past trip, while windows 700-726 of particular-trip-viewer 6000 may depict information that is specific to the particular trip. Some other implementations may include additional windows, while other implementations may include fewer windows.

Past-trip-viewer 579 for a past trip may depict various information specific for the past trip. For example, past-trip-viewer 579 may include a trip identification window 700A that shows a departure time of the past trip, an estimated arrival time of the past trip, a code of the airport from which the flight departed, and a code of the airport at which the trip will end. In the depicted example, the flight took off from San Jose (SJC) airport at 9 UTC and was estimated to end at San Diego (SAN) at 11:30 UTC.

Past-trip-viewer 579 for the past trip 702A may also depict a map 704A, which graphically represents a flight path from the departing airport to the destination.

Past-trip-viewer 579 may further depict a tail information window 706A which may provide a tail identification of the vehicle using during the past trip, a make of the vehicle, a model, a version of the software implemented on the vehicle, and a version of the content. Other information may also be presented in that window.

Past-trip-viewer 579 may also depict a past-trips-viewer 700HA that includes information about the past trips that are similar to the past trip.

Furthermore, past-trip-viewer 579 for a past trip may depict a key flight metrics window 710A. Window 710A may include flight metrics information about various onboard services provided during the past trip. Details are described in FIG. 4A.

Referring again to past-trip-viewer 570, the viewer may also include an events timeline window 714, a hardware status window 716, an IFC availability window 719, an IFC sessions window 722, an IFE availability window 724, and IFE sessions window 726.

Example Process for Generating Past-Trips-Viewer

Figure 6B:
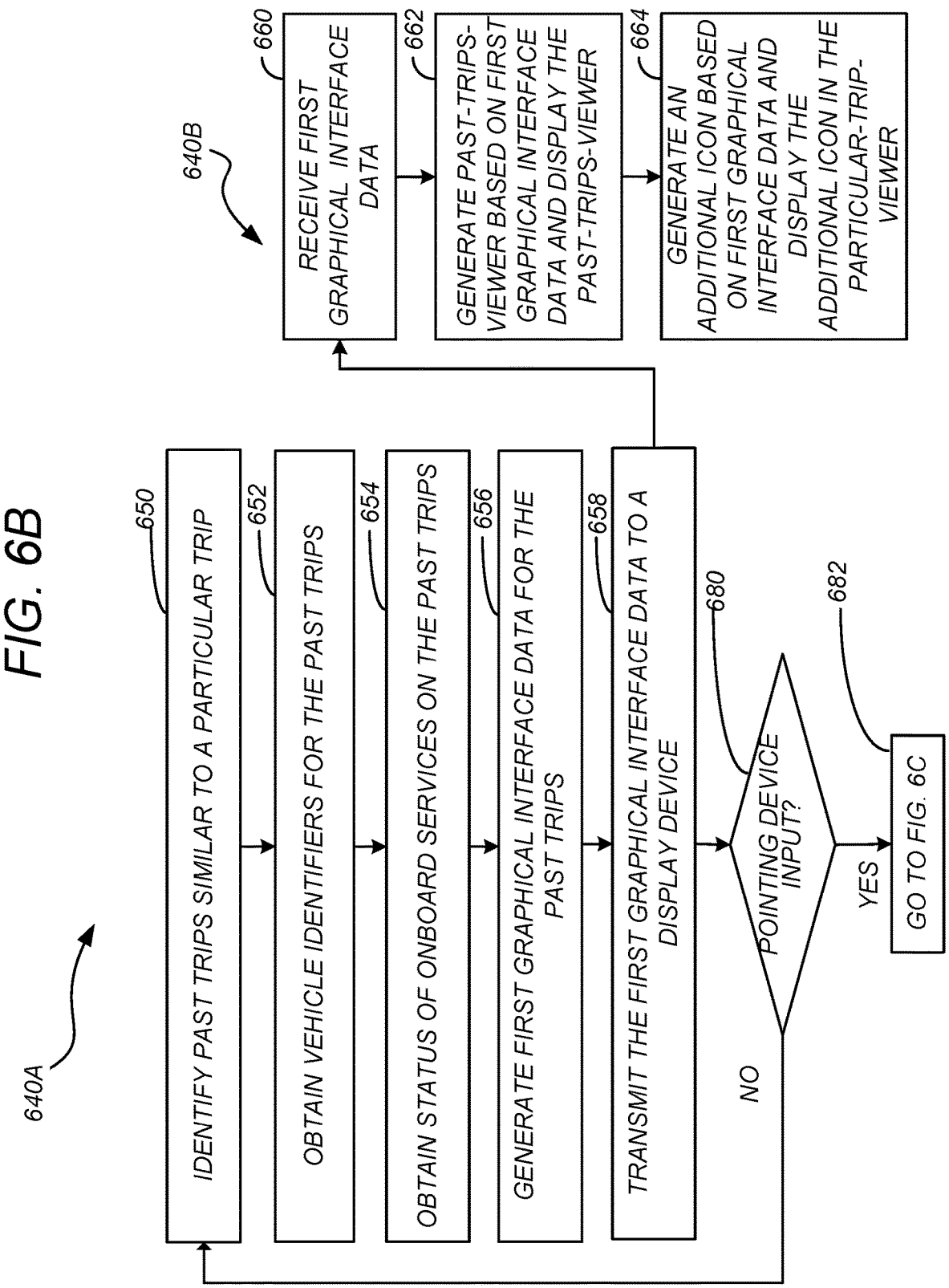
FIG. 6B is an example process for generating a graphical user interface used to visualize a past-trips-viewer with similar past trips.

FIG. 6B is an example process for generating a graphical user interface used to visualize a past-trips-viewer with similar past trips. Steps of the process 640A-640B may be performed by control circuitry of an apparatus for monitoring a network communications service onboard a vehicle and/or at least in part by an on-ground communications service monitoring server, such as on-ground system 112 of FIG. 1 or on-ground system 200 of FIG. 2, described in detail above.

In some embodiments, the apparatus performing some or all steps 640A-640B may be part of an on-ground server that is configured to monitor network communication services of multiple vehicles. With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

In some embodiments, an example process may include steps 640A performed by, for example, service monitor 202 of on-ground system 220 shown in FIG. 2, and steps 640B performed by, for example, display device 214 of on-ground system 220 shown in FIG. 2. In some other implementations, steps 640A-640B may be performed by other components of on-ground system 200 shown in FIG. 2, or by some components of onboard system 350 shown in FIG. 3.

In step 650, a service monitor identifies, one or more past trips, each of the one or more past trips having a past trip characteristic similar to a particular trip characteristic of a particular trip. Various types of trip characteristics and various ways of determining the similar trips are described in FIG. 6A.

In step 652, the service monitor obtains one or more vehicle identifiers used during the one or more past trips. The vehicle identifiers may be tail IDs, nose IDs, aircraft serial numbers, and the like.

In step 654, the service monitor obtains status of one or more onboard services that were provided during each of the one or more past trips. The status of an onboard service provided during a past trip may correspond to a performance indicator determined for the onboard service provided during the past trip.

In step 656, the service monitor generates first graphical interface data representing: a past trip header comprising labels for the past trip characteristic, the vehicle identifier, and the one or more onboard services. The first graphical interface data may also represent the past trip characteristic for each of the one or more past trips, the vehicle identifier of a vehicle used during each of the one or more past trips, an icon for each of the one or more past trips having a feature indicating the status of one or more onboard services provided during the past trip, and an additional icon for the particular trip indicating status of one or more onboard services provided during the particular trip.

In some embodiments, the service monitor also includes, in the first graphical interface data, an additional icon for the particular trip. The additional icon may indicate status of onboard services provided during the particular trip.

In step 658, the service monitor transmits the first graphical interface data to a display device to cause the display device to: receive (step 660) the first graphical interface data and generate and display (step 662) a past-trips-viewer. In some embodiments, the past-trips-viewer comprises: the past trip header; and the past trip characteristic, the vehicle identifier and the icon for each of the one or more past trips arranged in rows under the past trip header. Examples of past-trips-viewers are described in FIG. 6A.

Furthermore, based on the first graphical interface data, the display device generates (step 664) an additional icon that indicates status of the onboard services during the particular trip and displays the additional icon in a particular-trip-viewer. In FIG. 4A, the additional icon corresponds to icon 712 shown in particular-trip-viewer 6000.

In step 680, the service monitor determines whether input from a pointing device is received via the graphical user interface. The input may be detected when the service monitor detects that, for example, a pointing device such as a cursor is hovering over a certain element displayed in the past-trips-viewer. If the service monitor determines that the input has been received, then the steps shown in FIG. 6C are performed. Otherwise, step 650 is performed.

Example Process for Implementing Interactivity Detected Based on a Pointing Device FIG. 6C is an example process for generating a graphical user interface showing a past-trip-viewer when a pointing device is hovering over a past trip in a past-trips-viewer and generating a graphical user interface showing a past-vehicle-viewer when a pointing device is hovering over a past vehicle identifier of a vehicle used in a past trip and shown in the past-trips-viewer. In some embodiments, the apparatus performing the steps 6079-6086 may be part of an on-ground server that is configured to monitor network communications services of multiple vehicles. With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described. In the example below, it is assumed that the steps are performed by a service monitor 202 shown in FIG. 2.

The process starts in step 6079, and proceeds to step 6080.

If, in step 6080, a service monitor detects that a pointing device is hovering over a vehicle identifier of a vehicle that was used during a past trip of the past trips shown in a past-trips-viewer, then the service monitor proceeds to step 6082. Otherwise, the service monitor proceeds to step 6084.

In step 6082, the service monitor determined that the pointing device has been hovering over the vehicle identifier of the vehicle that was used during the particular past trip. In this context, the hovering is equated herein with selecting the vehicle identifier of that vehicle. In response to receiving the selection of the vehicle identifier of the past trip from the past-trips-viewer, the service monitor may request from, for example, an on-board system, information about the vehicle that corresponds to the selected vehicle identifier.

Upon receiving that information, the service monitor may generate data for past-vehicle-viewer 500, example of which is shown in FIG. 5A, and that depicts the information about the vehicle used during the past trip. Then, the service monitor may transmit past-vehicle-viewer data to a display device to cause the display device to display past-vehicle-viewer 500. An example of past-vehicle-viewer 500 is described in FIG. 5A.

Referring again to FIG. 6C, in step 6084, the service monitor determines whether the pointing device has been hovering over a particular characteristic of one of the past trips shown in past-trips-viewer 600H. In this context, the hovering is equated herein with selecting the past trip that has the particular characteristic from past-trips-viewer 600H.

In step 6086, in response to receiving the selection of the characteristic of the past trip from the past-trips-viewer, the service monitor may request from, for example, an on-board system, information about the past trip. Upon receiving that information, the service monitor may generate data for past-trip-viewer 579, shown in FIG. 5B. Past-trip-viewer 579 may depict the information about the past trip. The service monitor may transmit past-trip-viewer data to a display device to cause the display device to display past-trip-viewer 579. An example of past-trip-viewer 579 is shown in FIG. 5B.

However, if no input is received, then the service monitor proceeds to performing step 650.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules but may be represented in hardware and/or firmware. Moreover, although in some embodiments a module may be separately compiled, in other embodiments a module may represent a subset of instructions of a separately compiled program and may not have an interface available to other logical program units.

What is claimed is:

1. A method for visualizing performance indicators of onboard services provided during similar trips, the method comprising:
   identifying one or more past trips, each of the one or more past trips having a past trip characteristic, of one or more characteristics, similar to a particular trip characteristic, of the one or more characteristics, of a particular trip;

wherein the one or more characteristics comprise: an origin location, a departure time, a destination location, an arrival time, and a trip identifier;

wherein the past trip characteristic of the past trip is similar to the particular trip characteristic of the particular trip when the past trip characteristic of the past trip is the same as the particular trip characteristic of the particular trip, or within a predetermined time period from the particular trip characteristic of the particular trip, or within a predetermined distance from the particular trip characteristic of the particular trip;

obtaining a vehicle identifier used during each of the one or more past trips;

obtaining status of one or more onboard services provided during each of the one or more past trips;

generating first graphical interface data representing:
   a past trip header comprising labels for the past trip characteristic, the vehicle identifier, and the one or more onboard services;
   the past trip characteristic for each of the one or more past trips;
   the vehicle identifier used during each of the one or more past trips;
   an icon for each of the one or more past trips having a feature indicating the status of the one or more onboard services provided during the past trip; and
   an additional icon for the particular trip indicating status of the one or more onboard services provided during the particular trip;

transmitting, to a display device, the first graphical interface data to cause the display device to:
   generate and display a past-trips-viewer that comprises:
      the past trip header;
      the past trip characteristic, the vehicle identifier and the icon for each of the one or more past trips arranged in rows under the past trip header; and
   generate and display a particular-trip-viewer that comprises the additional icon for the particular trip.

2. The method of claim 1, wherein the status of the one or more onboard services that were provided during the past trip, of the one or more past trips, includes aggregated status information about the one or more onboard services provided during an entire duration of the past trip.

3. The method of claim 1, wherein the particular-trip-viewer for the particular trip depicts information about one or more particular trip characteristics of the particular trip.

4. The method of claim 1, further comprising: in response to determining that a pointing device is hovering over a particular past trip characteristic of a particular past trip, of the one or more past trips, displayed in the past-trips-viewer:
   obtaining information about the particular past trip;
   generating second graphical interface data representing the information about the particular past trip; and
   transmitting the second graphical interface data to the display device to cause the display device to generate and display a particular-past-trip-viewer depicting the information about the particular past trip.

5. The method of claim 1, further comprising: in response to determining that a pointing device is hovering over a particular vehicle identifier of a particular past trip, of the one or more past trips, displayed in the past-trips-viewer:
   obtaining information about a particular vehicle used during the particular past trip;
   generating third graphical interface data representing the information about the particular vehicle used during the particular past trip; and
   transmitting the third graphical interface data to the display device to cause the display device to generate and display a past-vehicle-viewer depicting the information about the particular vehicle used during the particular past trip.

6. The method of claim 1, wherein each past trip displayed in the past-trips-viewer is selectable, and a selection causes generating a past-trip-viewer for a selected past trip.

7. The method of claim 1, wherein a vehicle identifier of the past trip uniquely identifies a past trip vehicle used during the past trip; and wherein a vehicle identifier of the particular trip uniquely identifies a particular trip vehicle used during the particular trip.

8. An apparatus for visualizing performance indicators of onboard services provided during similar trips, the apparatus comprising:
   a processor,
   memory in electronic communications with the processor; and
   instructions stored in the memory and executable by the processor to cause the processor to perform:
   identifying one or more past trips, each of the one or more past trips having a past trip characteristic, of one or more characteristics, similar to a particular trip characteristic, of the one or more characteristics, of a particular trip;
   wherein the one or more characteristics comprise: an origin location, a departure time, a destination location, an arrival time, and a trip identifier;
   wherein the past trip characteristic of the past trip is similar to the particular trip characteristic of the particular trip when the past trip characteristic of the past trip is the same as the particular trip characteristic of the particular trip, or within a predetermined time period from the particular trip characteristic of the particular trip, or within a predetermined distance from the particular trip characteristic of the particular trip;
   obtaining a vehicle identifier used during each of the one or more past trips;
   obtaining status of one or more onboard services provided during each of the one or more past trips;
   generating first graphical interface data representing:
      a past trip header comprising labels for the past trip characteristic, the vehicle identifier, and the one or more onboard services;
      the past trip characteristic for each of the one or more past trips;
      the vehicle identifier used during each of the one or more past trips;
      an icon for each of the one or more past trips having a feature indicating the status of the one or more onboard services provided during the past trip; and
      an additional icon for the particular trip indicating status of the one or more onboard services provided during the particular trip;
   transmitting, to a display device, the first graphical interface data to cause the display device to:
      generate and display a past-trips-viewer that comprises:
         the past trip header;
         the past trip characteristic, the vehicle identifier and the icon for each of the one or more past trips arranged in rows under the past trip header; and
      generate and display a particular-trip-viewer that comprises the additional icon for the particular trip.

9. The apparatus of claim 8, wherein the status of the one or more onboard services that were provided during the past trip, of the one or more past trips, includes aggregated status information about the one or more onboard services provided during an entire duration of the past trip.

10. The apparatus of claim 8, wherein the particular-trip-viewer for the particular trip depicts information about one or more particular trip characteristics of the particular trip.

11. The apparatus of claim 8, storing additional instructions for: in response to determining that a pointing device is hovering over a particular past trip characteristic of a particular past trip, of the one or more past trips, displayed in the past-trips-viewer:
obtaining information about the particular past trip;
generating second graphical interface data representing the information about the particular past trip; and
transmitting the second graphical interface data to the display device to cause the display device to generate and display a particular-past-trip-viewer depicting the information about the particular past trip.

12. The apparatus of claim 8, storing additional instructions for: in response to determining that a pointing device is hovering over a particular vehicle identifier of a particular past trip, of the one or more past trips, displayed in the past-trips-viewer:
obtaining information about a particular vehicle used during the particular past trip;
generating third graphical interface data representing the information about the particular vehicle used during the particular past trip; and
transmitting the third graphical interface data to the display device to cause the display device to generate and display a past-vehicle-viewer depicting the information about the particular vehicle used during the particular past trip.

13. The apparatus of claim 8, wherein each past trip displayed in the past-trips-viewer is selectable, and a selection causes generating a past-trip-viewer for a selected past trip.

14. The apparatus of claim 8, wherein a vehicle identifier of the past trip uniquely identifies a past trip vehicle used during the past trip; and wherein a vehicle identifier of the particular trip uniquely identifies a particular trip vehicle used during the particular trip.

15. One or more non-transitory computer-readable storage media storing computer code for visualizing performance indicators of onboard services provided during similar trips, the computer code comprising instructions which, when executed by a processor, cause the processor to perform:
identifying one or more past trips, each of the one or more past trips having a past trip characteristic, of one or more characteristics, similar to a particular trip characteristic, of the one or more characteristics, of a particular trip;
wherein the one or more characteristics comprise: an origin location, a departure time, a destination location, an arrival time, and a trip identifier;
wherein the past trip characteristic of the past trip is similar to the particular trip characteristic of the particular trip when the past trip characteristic of the past trip is the same as the particular trip characteristic of the particular trip, or within a predetermined time period from the particular trip characteristic of the particular trip, or within a predetermined distance from the particular trip characteristic of the particular trip;
obtaining a vehicle identifier used during each of the one or more past trips;
obtaining status of one or more onboard services provided during each of the one or more past trips;
generating first graphical interface data representing:
a past trip header comprising labels for the past trip characteristic, the vehicle identifier, and the one or more onboard services;
the past trip characteristic for each of the one or more past trips;
the vehicle identifier used during each of the one or more past trips;
an icon for each of the one or more past trips having a feature indicating the status of the one or more onboard services provided during the past trip; and
an additional icon for the particular trip indicating status of the one or more onboard services provided during the particular trip;
transmitting, to a display device, the first graphical interface data to cause the display device to:
generate and display a past-trips-viewer that comprises:
the past trip header;
the past trip characteristic, the vehicle identifier and the icon for each of the one or more past trips arranged in rows under the past trip header; and
generate and display a particular-trip-viewer that comprises the additional icon for the particular trip.

16. The one or more non-transitory computer-readable storage media of claim 15, wherein the status of the one or more onboard services that were provided during the past trip, of the one or more past trips, includes aggregated status information about the one or more onboard services provided during an entire duration of the past trip.

17. The one or more non-transitory computer-readable storage media of claim 15, wherein the particular-trip-viewer for the particular trip depicts information about one or more particular trip characteristics of the particular trip.

18. The one or more non-transitory computer-readable storage media of claim 15, storing additional instructions for: in response to determining that a pointing device is hovering over a particular past trip characteristic of a particular past trip, of the one or more past trips, displayed in the past-trips-viewer:
obtaining information about the particular past trip;
generating second graphical interface data representing the information about the particular past trip; and
transmitting the second graphical interface data to the display device to cause the display device to generate and display a particular-past-trip-viewer depicting the information about the particular past trip.

19. The one or more non-transitory computer-readable storage media of claim 15, storing additional instructions for: in response to determining that a pointing device is hovering over a particular vehicle identifier of a particular past trip, of the one or more past trips, displayed in the past-trips-viewer:
obtaining information about a particular vehicle used during the particular past trip;
generating third graphical interface data representing the information about the particular vehicle used during the particular past trip; and
transmitting the third graphical interface data to the display device to cause the display device to generate and display a past-vehicle-viewer depicting the information about the particular vehicle used during the particular past trip.

20. The one or more non-transitory computer-readable storage media of claim 15, wherein each past trip displayed in the past-trips-viewer is selectable, and a selection causes generating a past-trip-viewer for a selected past trip.

21. The one or more non-transitory computer-readable storage media of claim 15, wherein a vehicle identifier of the past trip uniquely identifies a past trip vehicle used during the past trip; and wherein a vehicle identifier of the particular trip uniquely identifies a particular trip vehicle used during the particular trip.

\* \* \* \* \*